US011341361B2

(12) United States Patent
Kubota et al.

(10) Patent No.: US 11,341,361 B2
(45) Date of Patent: May 24, 2022

(54) ANALYSIS APPARATUS, STORAGE MEDIUM STORING ANALYSIS PROGRAM, AND ANALYSIS METHOD

(71) Applicant: FUJITSU LIMITED, Kawasaki (JP)

(72) Inventors: Tomonori Kubota, Kawasaki (JP); Takanori Nakao, Kawasaki (JP); Yasuyuki Murata, Shizuoka (JP)

(73) Assignee: FUJITSU LIMITED, Kawasaki (JP)

( * ) Notice: Subject to any disclaimer, the term of this patent is extended or adjusted under 35 U.S.C. 154(b) by 49 days.

(21) Appl. No.: 17/063,742

(22) Filed: Oct. 6, 2020

(65) Prior Publication Data

US 2021/0133485 A1  May 6, 2021

(30) Foreign Application Priority Data

Nov. 5, 2019  (JP) .............................. JP2019-200866

(51) Int. Cl.
 *G06K 9/62* (2022.01)
 *G06N 3/08* (2006.01)

(52) U.S. Cl.
 CPC .......... *G06K 9/623* (2013.01); *G06K 9/6232* (2013.01); *G06K 9/6256* (2013.01); *G06N 3/084* (2013.01)

(58) Field of Classification Search
 CPC .... G06V 20/10; G06V 10/454; G06N 3/0454; G06N 3/0481; G06N 3/084;
 (Continued)

(56) References Cited

U.S. PATENT DOCUMENTS

| 10,657,376 | B2* | 5/2020 | Lee | .......................... G06N 3/04 |
| 2019/0313963 | A1* | 10/2019 | Hillen | .................. A61B 5/7267 |
| 2021/0270722 | A1* | 9/2021 | Chou | .................... G06T 7/0012 |

FOREIGN PATENT DOCUMENTS

| JP | 2009-086926 A | 4/2009 |
| JP | 2009-211490 A | 9/2009 |

(Continued)

OTHER PUBLICATIONS

Ramprasaath R. Selvaraju et al., "Grad-CAM: Visual Explanations from Deep Networks via Gradient-based Localization", The IEEE International Conference on Computer Vision (ICCV), pp. 618-626, 2017 (Totoal 9 pages).

*Primary Examiner* — Juan A Torres
(74) *Attorney, Agent, or Firm* — Fujitsu Patent Center

(57) ABSTRACT

An analysis method executed by a computer includes acquiring a refine image that maximizes a score for inferring a correct label by an inferring process using a trained model, the refine image being generated from an input image used when an incorrect label is inferred; generating a map indicating a region of pixels having the same or similar level of attention degree related to inference in the inferring process, of a plurality of pixels in the generated refine image, based on a feature amount used in the inferring process; extracting an image corresponding to a pixel region whose level in the generated map is a predetermined level, from calculated images calculated based on the input image and the refine image; and generating an output image that specifies a portion related to an inference error in the inferring process, among the calculated images, based on image processing on the extracted image.

10 Claims, 30 Drawing Sheets

(58) Field of Classification Search
CPC .. G06K 9/6271; G06K 9/6256; G06K 9/6232; G06K 9/623
USPC ........................................................ 382/155
See application file for complete search history.

(56) References Cited

FOREIGN PATENT DOCUMENTS

| JP | 2013-114596 A | 6/2013 |
| JP | 2018-032078 A | 3/2018 |
| JP | 2018-045350 A | 3/2018 |
| JP | 2018-097807 A | 6/2018 |

* cited by examiner

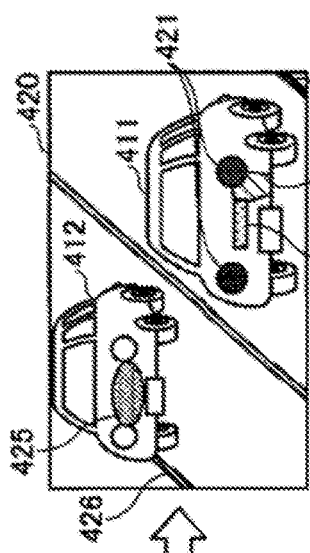
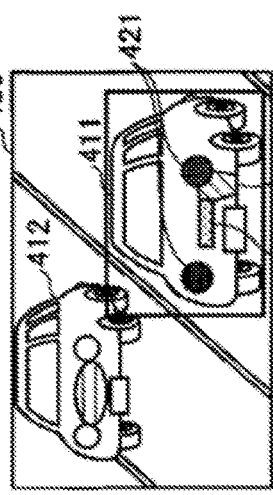
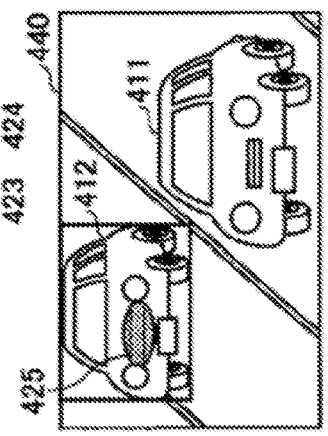
FIG. 4A  FIG. 4B-1  FIG. 4B-2

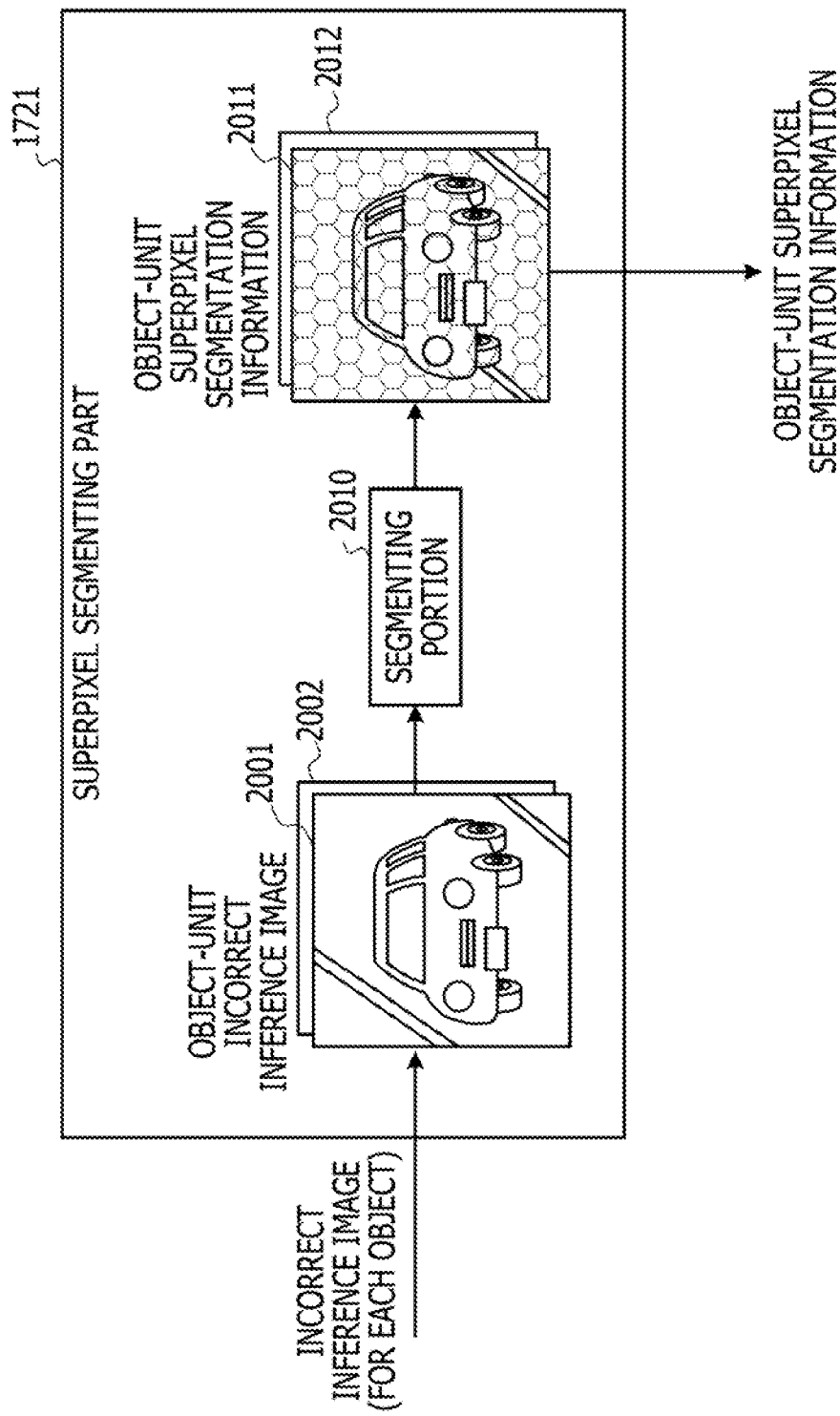

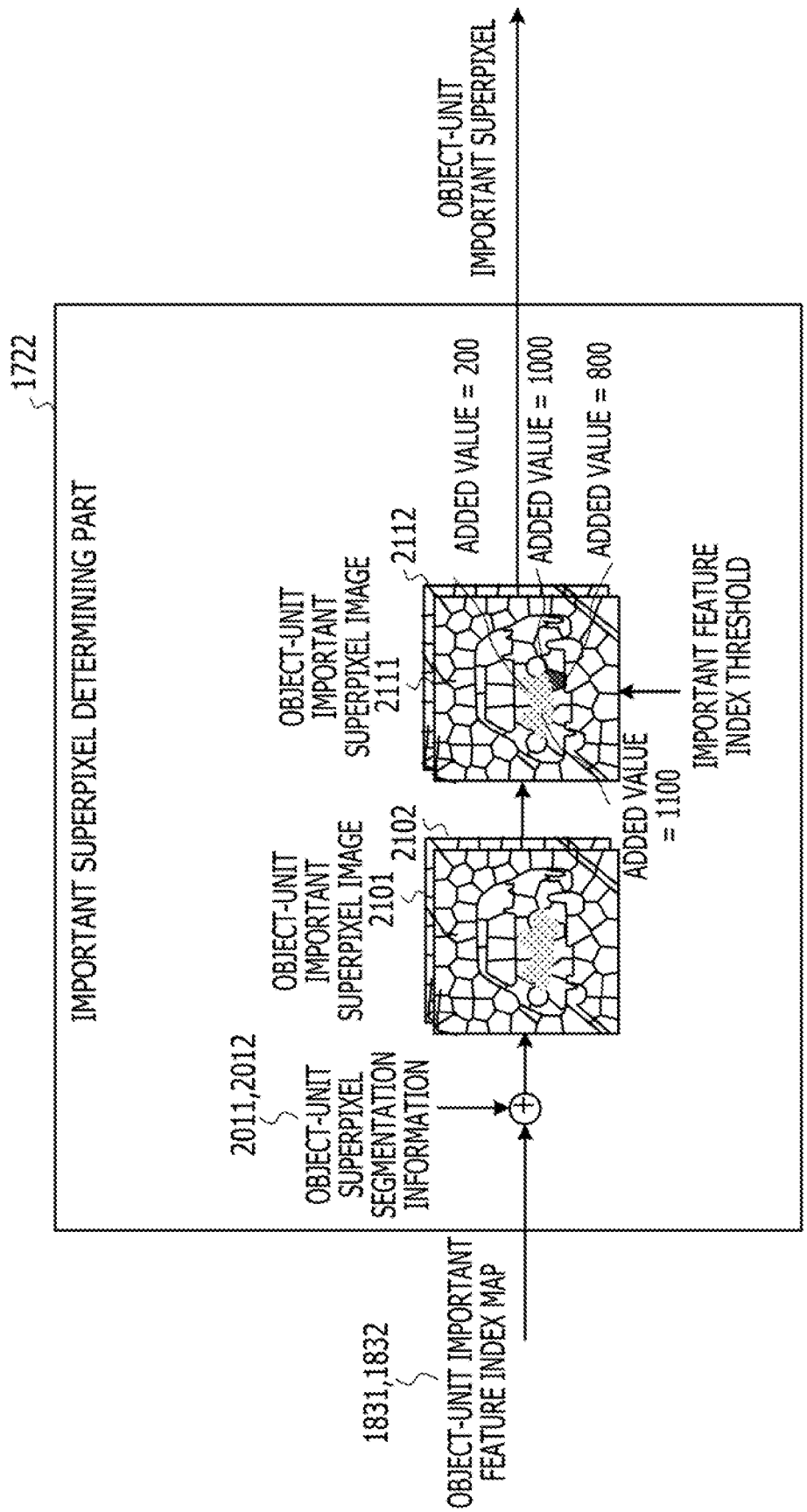

ANALYSIS APPARATUS, STORAGE MEDIUM STORING ANALYSIS PROGRAM, AND ANALYSIS METHOD

CROSS-REFERENCE TO RELATED APPLICATION

This application is based upon and claims the benefit of priority of the prior Japanese Patent Application No. 2019-200866, filed on Nov. 5, 2019, the entire contents of which are incorporated herein by reference.

FIELD

The embodiments discussed herein are related to an analysis apparatus, a storage medium storing an analysis program, and an analysis method.

BACKGROUND

In recent years, analysis techniques have been proposed that analyze a cause of incorrect inference when an incorrect label is inferred in an image recognition process using a convolutional neural network (CNN). Such techniques include the activation maximization method. There are proposed the analysis techniques for analyzing an image section that draws attention at the time of inference in the image recognition process. Examples of such techniques include a Grad-CAM method, a back propagation (BP) method, a guided back propagation (GBP) method, and the like.

The activation maximization method is a method of specifying, as an image section that causes incorrect inference, a changed portion when an input image is changed so that a correct label of inference has a maximum score. The Grad-CAM method is a method in which attention portions in inference are calculated using information back-propagated from inferred labels and the calculated attention portions are visualized by a heat map. The BP method and the GBP method are methods in which feature portions that have reacted in inference are visualized by back-propagation from inferred labels to an input image. Examples of the related art include Japanese Laid-open Patent Publication No. 2018-097807, Japanese Laid-open Patent Publication No. 2018-045350, and Ramprasaath R. Selvaraju, et al.: Grad-cam: Visual explanations from deep networks via gradient-based localization. The IEEE International Conference on Computer Vision (ICCV), pp. 618-626, 2017.

SUMMARY

According to an aspect of the embodiments, an analysis apparatus, includes a memory; and a processor coupled to the memory and configured to: acquire a refine image that maximizes a score for inferring a correct label by an inferring process using a trained model, the refine image being generated from an input image used when an incorrect label is inferred by the inferring process, generate a map indicating a region of pixels having the same or similar level of attention degree related to inference in the inferring process, of a plurality of pixels in the generated refine image, based on a feature amount used in the inferring process, extract an image corresponding to a pixel region whose level in the generated map is a predetermined level, from calculated images calculated based on the input image and the refine image, and generate an output image that specifies a portion related to an inference error in the inferring process, among the calculated images, based on execution of image processing on the extracted image.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIGS. 4A to 4B-2 are diagrams illustrating a specific example of processing of an image refiner part;

FIG. 20 is a diagram illustrating a specific example of processing of a superpixel segmenting part;

FIG. 21 is a diagram illustrating a specific example of processing of an important superpixel determining part;

DESCRIPTION OF EMBODIMENTS

Figure 1:
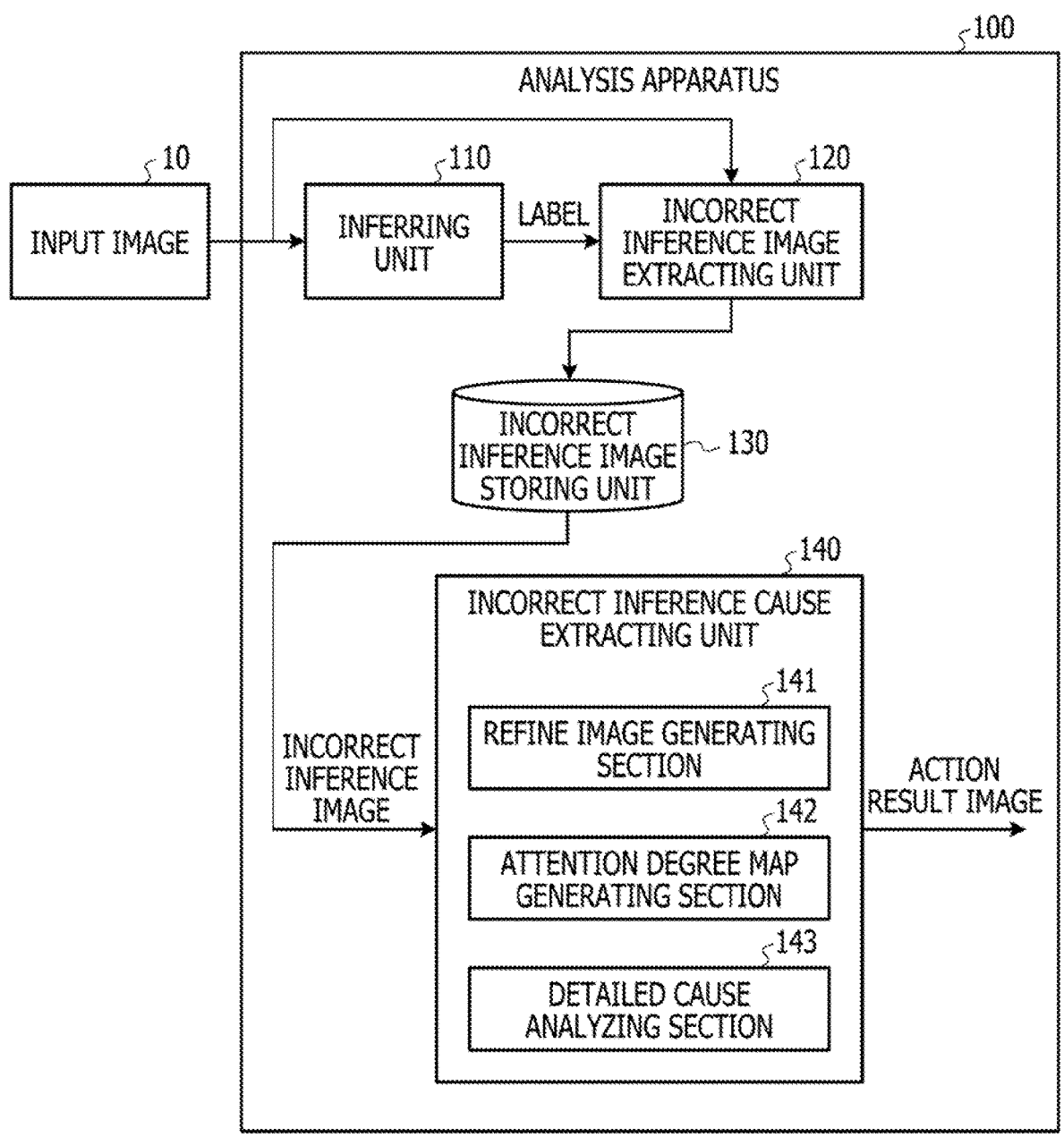
FIG. 1 is a diagram illustrating an example of a functional configuration of an analysis apparatus.

There is, however, a problem that the above-described analysis techniques may not specify an image section that causes incorrect inference with adequately high precision.

In view of the above, it is desirable to improve the precision at the time of specifying an image section that causes incorrect inference.

Hereinafter, respective embodiments will be described with reference to the accompanying drawings. In the present specification and drawings, components having substantially same functional configurations are assigned with same reference numerals, and overlapping description is omitted.

First Embodiment

<Functional Configuration of Analysis Apparatus>

First, a functional configuration of an analysis apparatus according to a first embodiment is described. FIG. 1 illustrates an example of the functional configuration of the analysis apparatus. In an analysis apparatus 100, analysis programs are installed, and execution of the programs causes the analysis apparatus 100 to function as an inferring unit 110, an incorrect inference image extracting unit 120, and an incorrect inference cause extracting unit 140.

The inferring unit 110 performs an image recognition process using a pre-trained CNN. For example, upon input of an input image 10, the inferring unit 110 infers a label indicating a type of an object (inference target) included in the input image 10 (a type of a vehicle in the present embodiment) and outputs the inferred label.

The incorrect inference image extracting unit 120 determines whether or not the label (correct label) indicating the type of the object contained in the input image 10 and the label inferred by the inferring unit 110 match. The incorrect inference image extracting unit 120 extracts the input image that is determined not to match (for which an incorrect label is inferred) as an "incorrect inference image" and stores the image in an incorrect inference image storing unit 130.

Alternatively, the incorrect inference image extracting unit 120 determines whether or not the correct position of the object contained in the input image 10 and the position of the object inferred by the inferring unit 110 match. The incorrect inference image extracting unit 120 extracts, as the "incorrect inference image", an input image in which the correct position of the object is determined to be off the inferred position of the object, or an input image in which a position of an object is not inferred, and stores the image in the incorrect inference image storing unit 130. For example, the correct position of the object may be added to the input image 10 as teacher information or may be acquired by inference in a state in which correct inference is possible. Alternatively, the correct position of the object may be specified by using other means.

The incorrect inference cause extracting unit 140 specifies an image section that causes incorrect inference from an incorrect inference image and outputs an action result image. For example, the incorrect inference cause extracting unit 140 includes a refine image generating section 141, an attention degree map generating section 142, and a detailed cause analyzing section 143.

The refine image generating section 141 is an example of the image generating section. The refine image generating section 141 reads the incorrect inference image stored in the incorrect inference image storing unit 130. The refine image generating section 141 generates a score-maximized refine image having a maximized correct label score of inference, from the read incorrect inference image.

The attention degree map generating section 142 uses a known analysis technique for analyzing the cause of incorrect inference, and the like to generate a heat map (hereinafter referred to as the attention degree map) indicating a region of pixels with the same level of attention degree at the time of inference.

The detailed cause analyzing section 143 is an example of a visualizing section, which performs an enhancing process for each pixel by cutting out an image corresponding to a predetermined level region of the attention degree map generated by the attention degree map generating section 142 from the image calculated based on the incorrect inference image and the refine image. As such, the detailed cause analyzing section 143 outputs an action result image in which the image section that causes incorrect inference is visualized.

Accordingly, the image section that causes incorrect inference may be specified with high precision by performing the enhancing process for each pixel with respect to the predetermined level region of the attention degree map in the image calculated based on the incorrect inference image and the refine image.

<Hardware Configuration of Analysis Apparatus>

Figure 2:
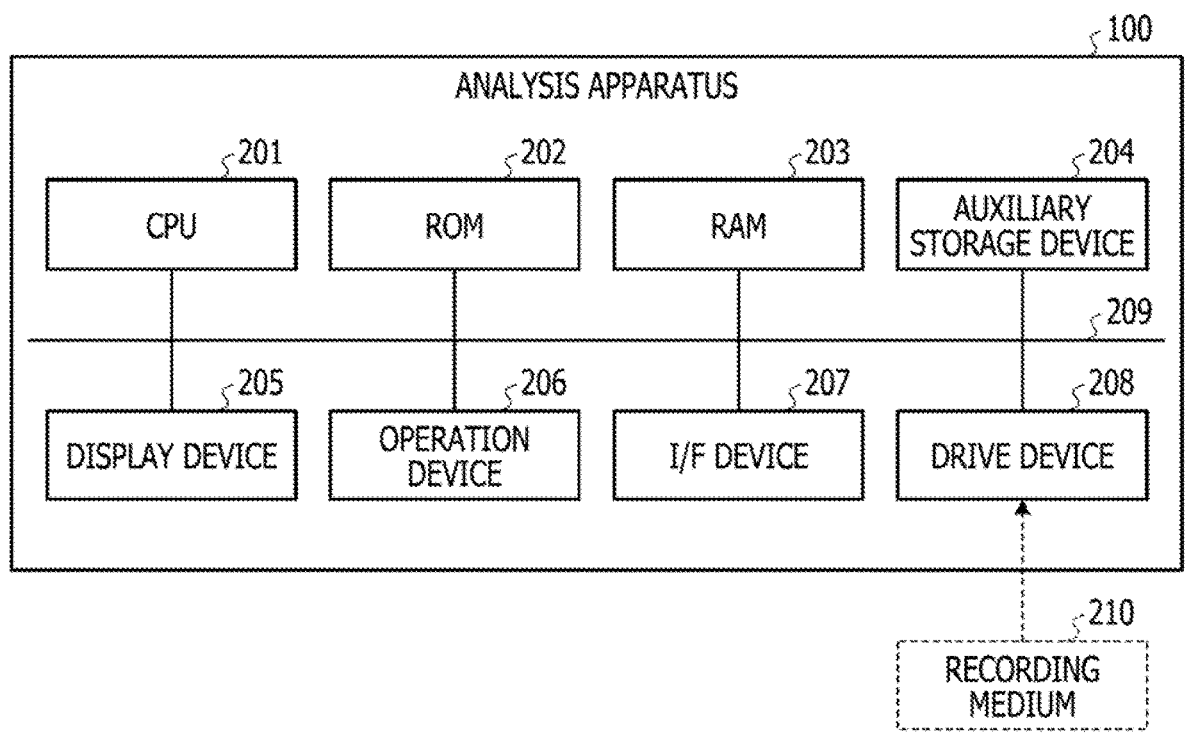
FIG. 2 is a diagram illustrating an example of a hardware configuration of the analysis apparatus.

Next, a hardware configuration of the analysis apparatus 100 is described. FIG. 2 illustrates an example of the hardware configuration of the analysis apparatus. As illustrated in FIG. 2, the analysis apparatus 100 includes a central processing unit (CPU) 201, a read-only memory (ROM) 202, and a random-access memory (RAM) 203. The CPU 201, the ROM 202, and the RAM 203 form a so-called computer.

The analysis apparatus 100 includes an auxiliary storage device 204, a display device 205, an operation device 206, an interface (I/F) device 207, and a drive device 208. Each of hardware components of the analysis apparatus 100 is coupled to each other via a bus 209.

The CPU 201 is a calculating device that runs various programs (for example, an analysis program and the like) installed in the auxiliary storage device 204. Although not illustrated in FIG. 2, an accelerator (for example, a graphics processing unit (GPU)) may be combined as a calculating device.

The ROM 202 is a non-volatile memory. The ROM 202 functions as a main storage device that stores various programs, data, and the like for the CPU 201 to execute the various programs installed in the auxiliary storage device 204. For example, the ROM 202 functions as a main storage device that stores a boot program such as a Basic Input/Output System (BIOS) and an Extensible Firmware Interface (EFI).

The RAM 203 is a volatile memory such as a dynamic random-access memory (DRAM) or a static random-access memory (SRAM). The RAM 203 functions as the main storage device that provides a work area where the various programs installed in the auxiliary storage device 204 are expanded for execution by the CPU 201.

The auxiliary storage device 204 is an auxiliary storage device that stores the various programs and information to be used for execution of the various programs. For example, the incorrect inference image storing unit 130 is implemented in the auxiliary storage device 204.

The display device 205 is a display device that displays various display screens containing incorrect inference cause information and the like. The operation device 206 is an input device for a user of the analysis apparatus 100 to input various instructions to the analysis apparatus 100.

The I/F device 207 is, for example, a communication device to couple to a network not illustrated.

The drive device 208 is a device in which a recording medium 210 is set. The recording media 210 discussed herein include media that record information optically, electrically, and magnetically like a CD-ROM, a flexible disk, a magneto-optical disk, and the like. The recording media 210 may also include a semiconductor memory and the like, such as the ROM, or a flash memory, which records information electrically.

The various programs to be installed in the auxiliary storage device 204 are installed, for example, as the distributed recording medium 210 is set in the drive device 208, and the various programs recorded in the recording medium 210 are read by the drive device 208. Alternatively, the various programs installed in the auxiliary storage device 204 may be installed by being downloaded from the network that is not illustrated.

<Functional Configuration of incorrect Inference Cause Extracting Unit>

Figure 3:
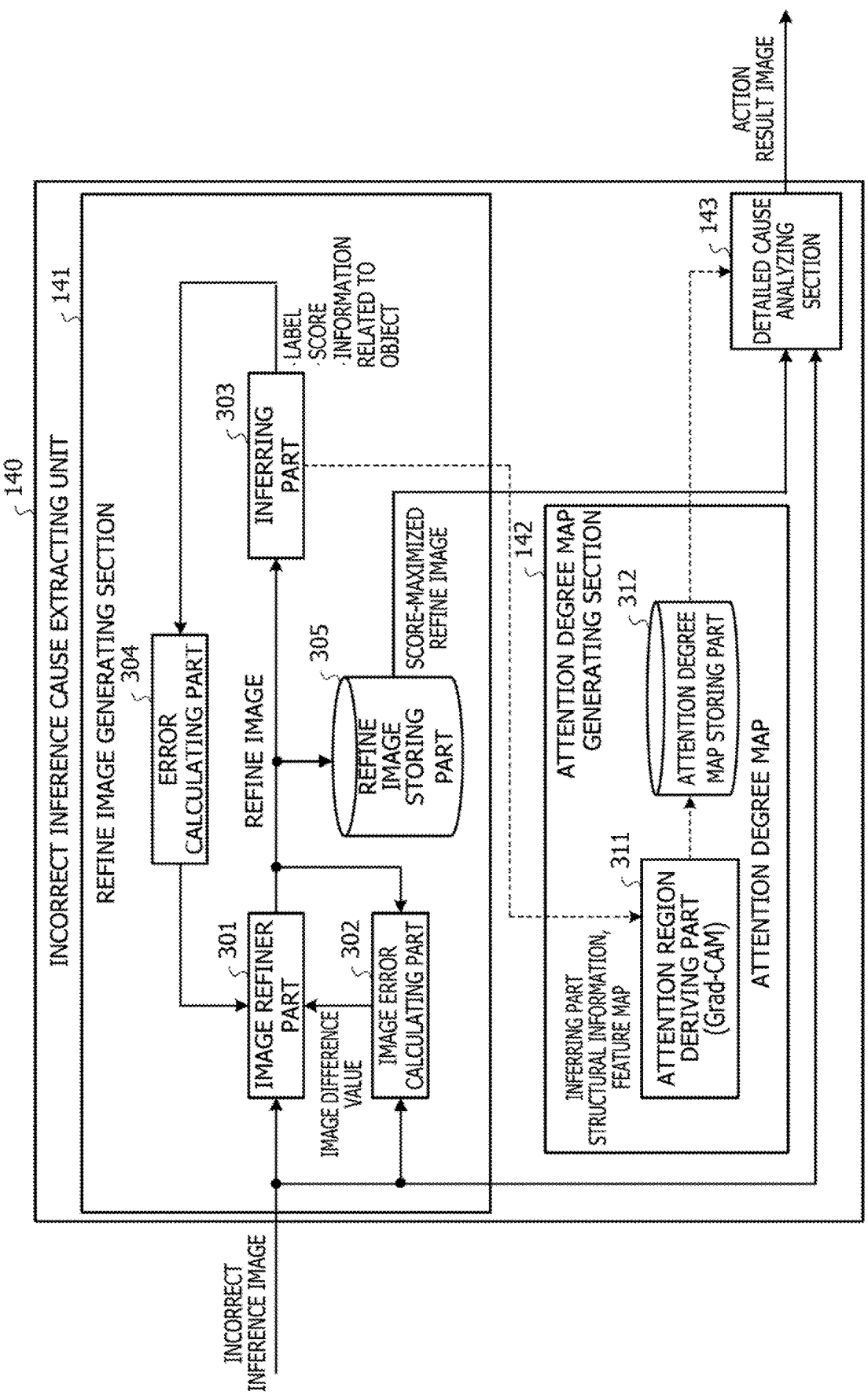
FIG. 3 is a first diagram illustrating an example of a functional configuration of an incorrect inference cause extracting unit.

Next, a functional configuration of the incorrect inference cause extracting unit 140 is described in detail among the functions implemented in the analysis apparatus 100 according to the first embodiment. FIG. 3 illustrates an example of the functional configuration of the incorrect inference cause extracting unit. The details of the components (the refine image generating section 141 and the attention degree map generating section 142) of the incorrect inference cause extracting unit 140 are described.

(1) Details of Refine Image Generating Section

First, the refine image generating section 141 is described in detail. As illustrated in FIG. 3, the refine image generating section 141 includes an image refiner part 301, an image error calculating part 302, the inferring part 303, and an error calculating part 304.

The image refiner part 301 generates a refine image from the incorrect inference image using the CNN as an image generation model, for example.

The image refiner part 301 changes the incorrect inference image such that the correct label score is maximized when inference is made using the generated refine image. When generating the refine image using the image generation model, the image refiner part 301 generates the refine image so that, for example, information related to the object included in the incorrect inference image is close to the correct information related to the object. When generating the refine image using the image generation model, the image refiner part 301 generates the refine image so that, for example, an amount of change from the incorrect inference image (difference between the refine image and the incorrect inference image) is small.

For example, the image refiner part 301 performs CNN training so as to minimize a score error that is an error between the score when making inference using the generated refine image and the maximized correct label score, an object error that is an error between information related to the object (inference target) when inferring the label using the generated refine image and the correct information related to the object of the correct label, and an image difference value that is a difference between the generated refine image and the incorrect inference image (for example, an image difference (L1 difference) or structural similarity (SSIM), or a combination of the L1 difference and the structural similarity).

The image error calculating part 302 calculates the difference between the incorrect inference image and the refine image outputted from the image refiner part 301 during training, and inputs the image difference value to the image refiner part 301. The image error calculating part 302 calculates the image difference value by performing difference (L1 difference) calculation for each pixel or structural similarity (SSIM) calculation, for example, and inputs the image difference value to the image refiner part 301.

The inferring part 303 performs an image recognition process using the trained CNN. The inferring part 303 includes the trained CNN that infers a label by inputting the refine image (or score-maximized refine image) generated by the image refiner part 301, and outputs a score.

When inferring the label by inputting the refine image, the inferring part 303 calculates information related to an object contained in the refine image, and notifies the information together with the score to the error calculating part 304.

The error calculating part 304 calculates the score error that is an error between the score notified by the inferring part 303 and the maximized correct label score, and notifies the score error to the image refiner part 301. The error calculating part 304 calculates the object error that is an error between the information related to the object notified by the inferring part 303 and the correct information related to the object of the correct label, and notifies the object error to the image refiner part 301.

The score error and the object error notified by the error calculating part 304 are used for CNN training by the image refiner part 301 together with the image difference value notified by the image error calculating part 302.

The refine image outputted from the image refiner part 301 during the training of the CNN included in the image refiner part 301 is stored in a refine image storing part 305. The training of the CNN included in the image refiner part 301 is performed for a predetermined number of training iterations (for example, the maximum number of training iterations=N times) or until the correct label score exceeds a predetermined threshold, or until the correct label score exceeds the predetermined threshold and the image difference value falls below a predetermined threshold, or until the object error falls below a predetermined threshold. Accordingly, the score-maximized refine image, which is the refine image when the correct label score outputted from the inferring part 303 is maximized, is stored in the refine image storing part 305.

(2) Details of Attention Degree Map Generating Section

Next, the attention degree map generating section 142 is described in detail. As illustrated in FIG. 3, the attention degree map generating section 142 includes an attention region deriving part 311.

The attention region deriving part 311 acquires, from the inferring part 303, a feature map and inferring part structural information (the structure of the network of the CNN, model parameters, and the like) when the inferring part 303 infers a correct label using a score-maximized refine image.

The attention region deriving part 311 calculates the degree of attention on each pixel on the incorrect inference image based on the inferring part structural information and the feature map using the Grad-CAM method to generate an attention degree map.

For example, the attention region deriving part 311 generates an attention degree map based on the inferring part structural information and the feature map by the following procedure. Back-propagation is performed from the label inferred by the inferring part 303 on the assumption that only the label has an error, and an average value for each channel is obtained for gradient information obtained in the last layer of convolution or in a selected layer, to determine the degree of importance of each channel. The feature map of each channel is multiplied by the degree of importance as a weight, and an activation function (ReLU) is applied to a result of adding up values of all the channels at the same coordinates to generate an image with only positive values. Attention portions with large pixel values (with large gradients) are visualized in the generated image utilizing a heat map (map indicating a region of pixels with the same level of attention degree) to generate an attention degree map.

The attention region deriving part 311 stores the generated attention degree map in an attention degree map storing part 312.

<Specific Example of Process of Each Component of Incorrect Inference Cause Extracting Unit>

Next, specific examples of processing of the components (the refine image generating section 141, the attention degree map generating section 142, and the detailed cause analyzing section 143) of the incorrect inference cause extracting unit 140 are described. In the following, description is given on the assumption that an incorrect inference image includes a plurality of objects (plurality of vehicles in this embodiment) as an inference target.

(1) Specific Example of Process of Refine Image Generating Section

First, specific examples of the processing of the components (the image refiner part 301, the inferring part 303, and the error calculating part 304) of the refine image generating section 141 are described.

(1-1) Specific Example of Processing of Image Refiner Part

FIGS. 4A to 4-2 illustrates the specific example of the processing of the image refiner part. As illustrated in FIGS. 4A to 4B-2, when an incorrect inference image 410 is inputted to the image refiner part 301, the image refiner part 301 generates a score-maximized refine image for each of objects (vehicles 411, 412) included in the inputted incorrect inference image 410.

In FIGS. 4A to 4B-2, the vehicle 411 is a vehicle that is incorrectly inferred as "vehicle model B" although the correct label="vehicle model A", while the vehicle 412 is a vehicle that is incorrectly inferred as "vehicle model C" although the correct label="vehicle model B".

When generating the score-maximized refine image for the vehicle 411 and the vehicle 412, the image refiner part 301 selectively performs any generation method of two generation methods (first and second generation methods).

A first generation method performed by the image refiner part 301 is a method of generating a score-maximized refine image so that scores of correct labels of all objects included in the incorrect inference image are maximized.

FIG. 4A illustrates a case where the image refiner part 301 generates the score-maximized refine image for the incorrect inference image 410 with the first generation method. The example of FIG. 4A illustrates that one score-maximized refine image 420, which allows for correct inference of the vehicle 411 as "vehicle model A" and the vehicle 412 as "vehicle model B", is generated by changing the color of headlights 421 of the vehicle 411, the color of a road sign 422, the color of a front grille 423 of the vehicle 411, the color of a vehicle body 424 between the front grille 423 and the left headlight 421 of the vehicle 411, the color of a front grille 425 of the vehicle 412, and the color of a road sign 426.

On the other hand, the second generation method executed by the image refiner part 301 is a method of generating a score-maximized refine image so that the score is maximized for each object included in the incorrect inference image. According to the second generation method, score-maximized refine images, the number of which corresponds to the number of the objects included in the incorrect inference image, are generated.

FIG. 4B-1 illustrates a case where the image refiner part 301 generates the score-maximized refine image for the vehicle 411 included in the incorrect inference image 410 with the second generation method. The example of FIG. 4B-1 illustrates that a score-maximized refine image 430, which allows for correct inference of the vehicle 411 as "vehicle model A", is generated by changing the color of the headlight 421 of the vehicle 411.

FIG. 4B-2 illustrates a case where the image refiner part 301 generates the score-maximized refine image for the vehicle 412 included in the incorrect inference image 410 with the second generation method. The example of FIG. 4B-2 illustrates that a score-maximized refine image 440, which allows for correct inference of the vehicle 412 as "vehicle model B", is generated by changing the color of the front grille 425 of the vehicle 412.

(1-2) Specific Example of Processing of Inferring Part

Figure 5:
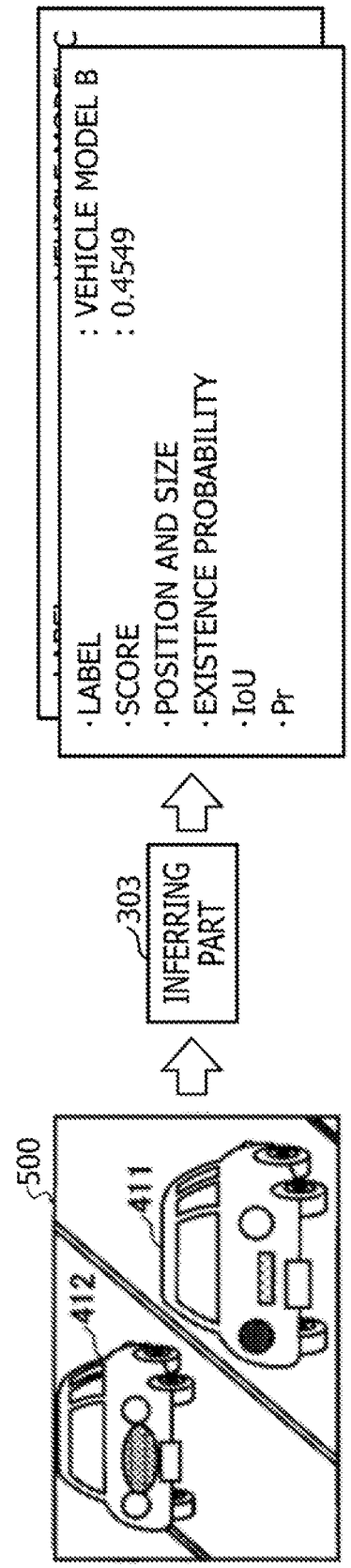
FIG. 5 is a diagram illustrating a specific example of processing of an inferring part.

FIG. 5 illustrates a specific example of processing of the inferring part. For example, the example of FIG. 5 illustrates a case where the image refiner part 301 inputs to the inferring part 303 a refine image 500 (refine image generated in the process of generating the score-maximized refine image) that is generated with the first generation method.

As illustrated in FIG. 5, the inferring part 303 calculates, as information related to the vehicle 411, "a position and a size", "an existence probability", "IU", and "Pr", in addition to a label and a score of the vehicle 411. Similarly, the inferring part 303 calculates, as information related to the vehicle 412, "a position and a size", "an existence probability", "IoU", and "Pr", in addition to a label and a score of the vehicle 412.

Hereinafter, the information related to the objects (information related to the vehicles 411 and 412) calculated by the inferring part 303 is described in detail, with reference to FIGS. 6 to 8.

(i) Position and Size

Figure 6:
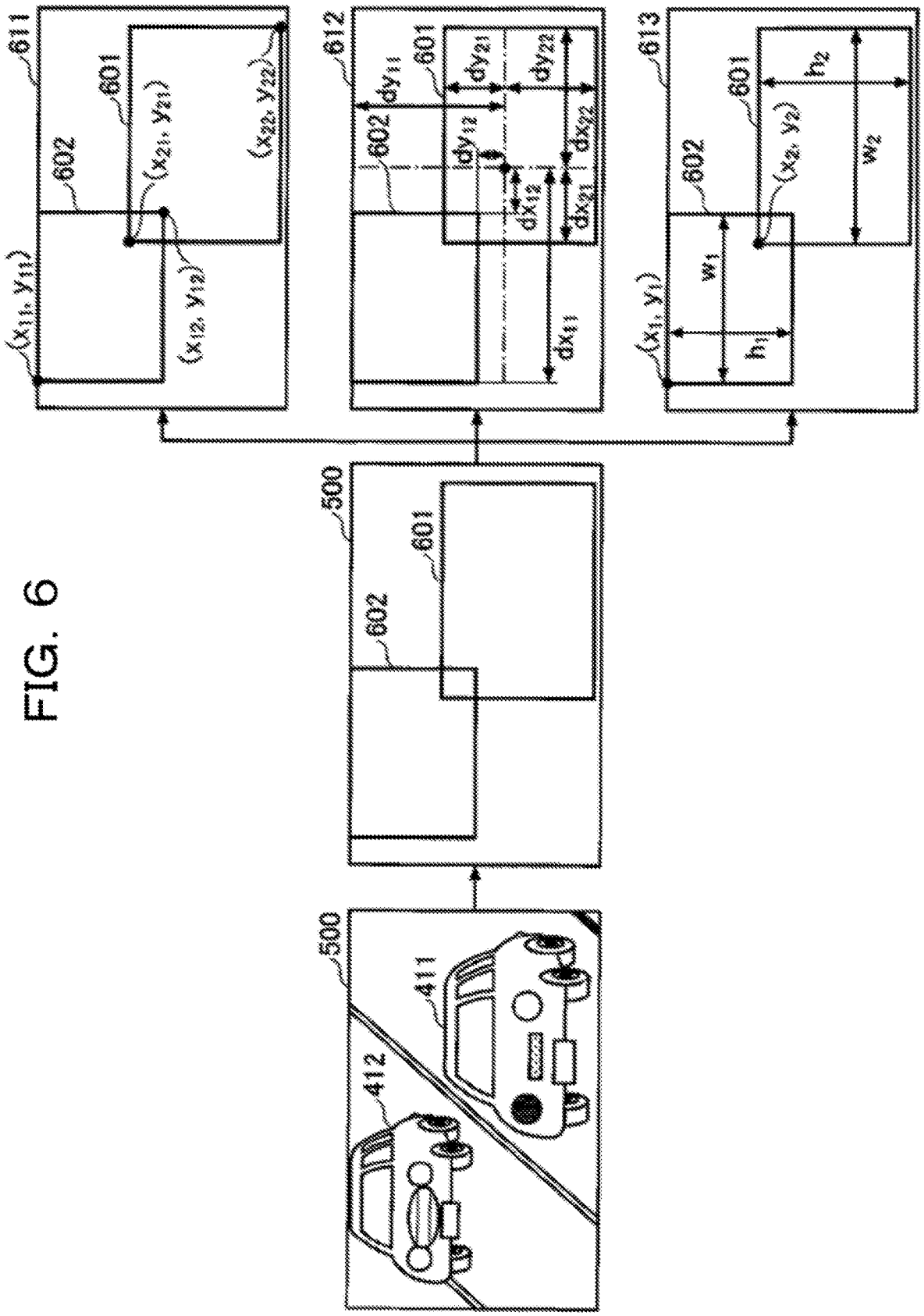
FIG. 6 is a diagram illustrating an example of a method of calculating a position and a size of an object contained in a refine image.

FIG. 6 is a diagram illustrating an example of a method of calculating a position and a size of an object contained in a refine image. The Inferring part 303 calculates a position and a size of an object by specifying bounding rectangles 601 and 602 of the objects (vehicles 411 and 412) included in the refine image 500.

The inferring part 303 has three calculating methods (first to third calculating methods) as a method of calculating a position and a size of an object and calculates the position and the size of the object with any of the calculating methods.

The first calculating method that the inferring part 303 has is a method of calculating coordinates of an upper left vertex and coordinates of an lower right vertex of each of the bounding rectangles 601 and 602. According to the first calculating method, as denoted by reference numeral 611, $(x_{11}, y_{11})$ and $(x_{12}, y_{12})$ are calculated as the position and the size of the vehicle 412 and $(x_{21}, y_{21})$ and $(x_{22}, y_{22})$ are calculated as the position and the size of the vehicle 411, respectively.

The second calculating method that the inferring part 303 has is a method of calculating a distance from a specific position to the upper left vertex and a distance from the specific position to the lower right vertex of each of the bounding rectangles 601 and 602. According to the second calculating method, as denoted by reference numeral 612, $dx_{11}, dy_{11}, dx_{12}$, and $dy_{12}$ are calculated as the position and the size of the vehicle 412 and $dx_{21}, dy_{21}, dx_{22}$, and $dy_{22}$ are calculated as the position and the size of the vehicle 411, respectively.

On the other hand, the third calculating method that the inferring part 303 has is a method of calculating the coordinates, a height, and a width of the upper left vertex of each of the bounding rectangles 601 and 602. According to the third calculating method, as denoted by reference numeral 613, $(x_1, y_1), h_1$, and $w_1$ are calculated as the position and the size of the vehicle 412 and $(x_2, y_2), h_2$, and $w_2$ are calculated as the position and the size of the vehicle 411, respectively.

Although the three calculating methods are illustrated in FIG. 6, the inferring part 303 may calculate the position and the size of the object in the refine image by a calculating method other than the calculating methods illustrated in FIG. 6.

For example, although the second calculating method sets a specific position as a reference, an upper left vertex of a rectangle that serves as a reference may be used as the specific position (fourth calculating method).

Although the third calculating method calculates the coordinates of the upper left vertex of the bounding rectangle, the third calculating method may calculate coordinates of a center position of the bounding rectangle (fifth calculating method).

(ii) Existence Probability

Figure 7:
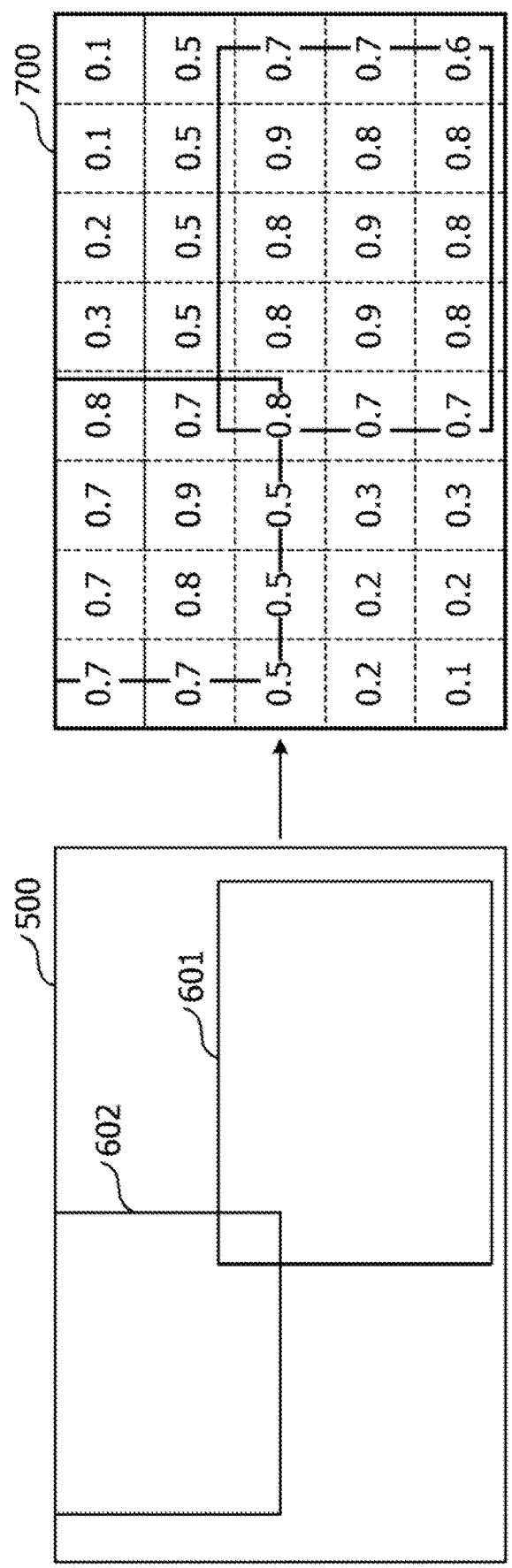
FIG. 7 is a diagram illustrating an example of an existence probability of the object contained in the refine image.
Figure 8:
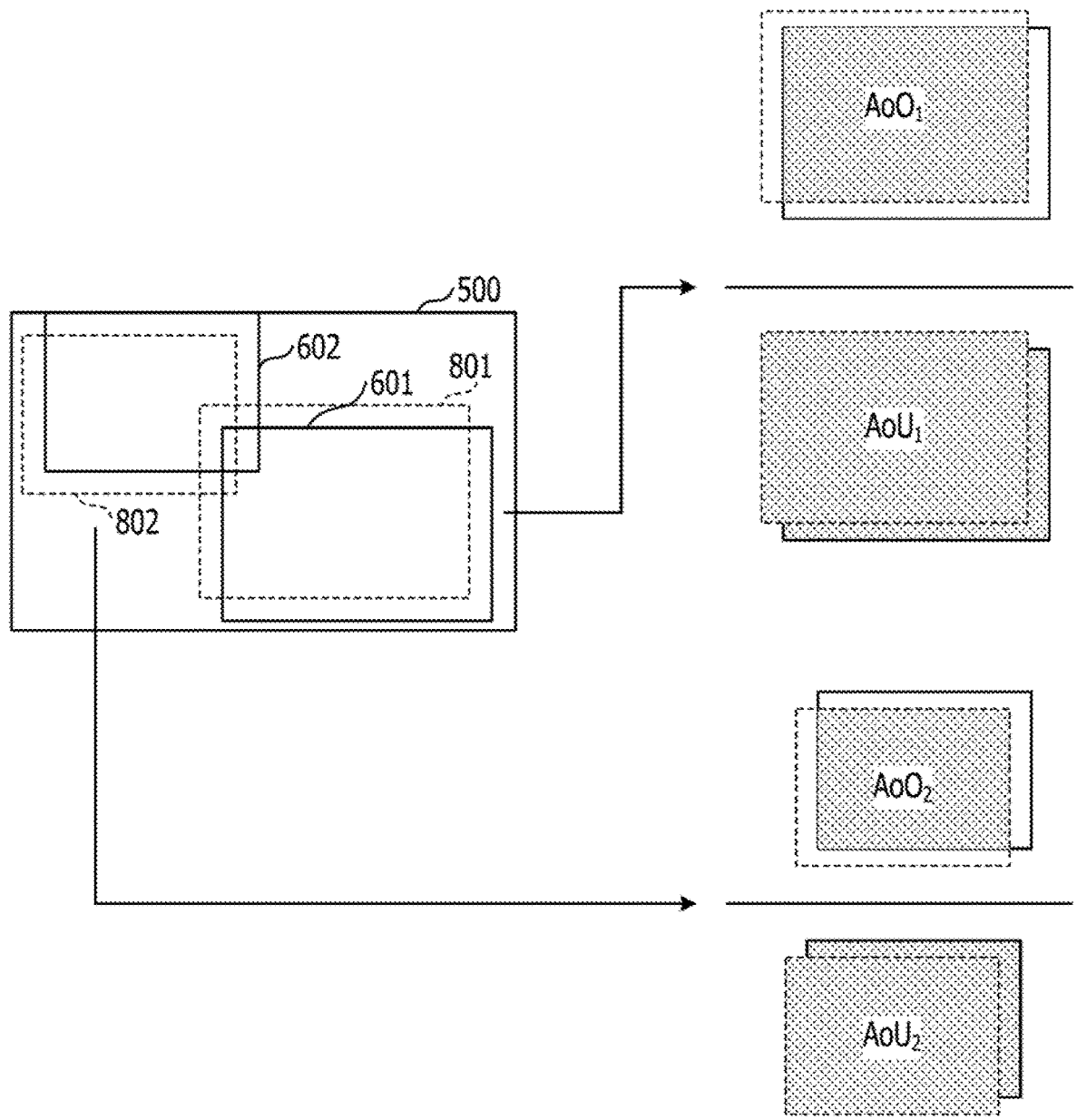
FIG. 8 is a diagram illustrating an example of a method of calculating intersection over union (IoU) of an object contained in a refine image.

FIG. 7 is a diagram illustrating an example of an existence probability of the object contained in the refine image. The inferring part 303 is capable of segmenting the refine image 500 into a plurality of blocks and calculating a probability that an object exists in each of the blocks.

In FIG. 7, a numeral 700 depicts a case where the existence probability of the vehicles 411, 412 is calculated, for each of the blocks represented by dashed lines.

(iii) IoU and Pr

Intersection over union (IoU) is an evaluation index that indicates whether it is possible for the inferring part 303 to correctly detect the vehicles 411, 412 in the refine image 500. FIG. 8 is a diagram illustrating an example of a method of calculating IoU of the object contained in the refine image. As illustrated in FIG. 8, if a correct bounding rectangle 801 is given to the bounding rectangle 601 of the vehicle 411 inferred by the inferring part 303, it is possible to calculate the IoU of the vehicle 411 with the following equation.

$$\text{IoU of the vehicle } 411 = AoO_1/AoU_1 \quad \text{(Equation 1)}$$

However, $AoO_1$ refers to an area of an intersection of the bounding rectangle 601 of the vehicle 411, which is inferred by the inferring part 303, and the correct bounding rectangle 801. $AoU_1$ refers to an area of a union of the bounding rectangle 601 of the vehicle 411, which is inferred by the inferring part 303, and the correct bounding rectangle 801.

If a correct bounding rectangle 802 is given to the bounding rectangle 602 of the vehicle 412 inferred by the inferring part 303, it is possible to calculate the IoU of the vehicle 412 with the following equation.

$$\text{IoU of the vehicle } 412 = AoO_2/AoU_2 \quad \text{(Equation 2)}$$

However, $AoO_2$ refers to an area of an intersection of the bounding rectangle 602 of the vehicle 412, which is inferred by the inferring part 303, and the correct bounding rectangle 802. $AoU_2$ refers to an area of a union of the bounding rectangle 602 of the vehicle 412, which is inferred by the inferring part 303, and the correct bounding rectangle 802.

On the other hand, Pr refers to a probability that the vehicle 411 (or 412) is included in the bounding rectangle 601 (or 602) of the vehicle 411 (or 412) inferred by the inferring part 303. It is possible to calculate a degree of confidence of the bounding rectangle 601 (or 602) of the vehicle 411 (or 412) inferred by the inferring part 303, by multiplying the IoU and Pr of the vehicles 411, 412.

(1-3) Specific Example of Processing of Error Calculating Part

Figure 9:
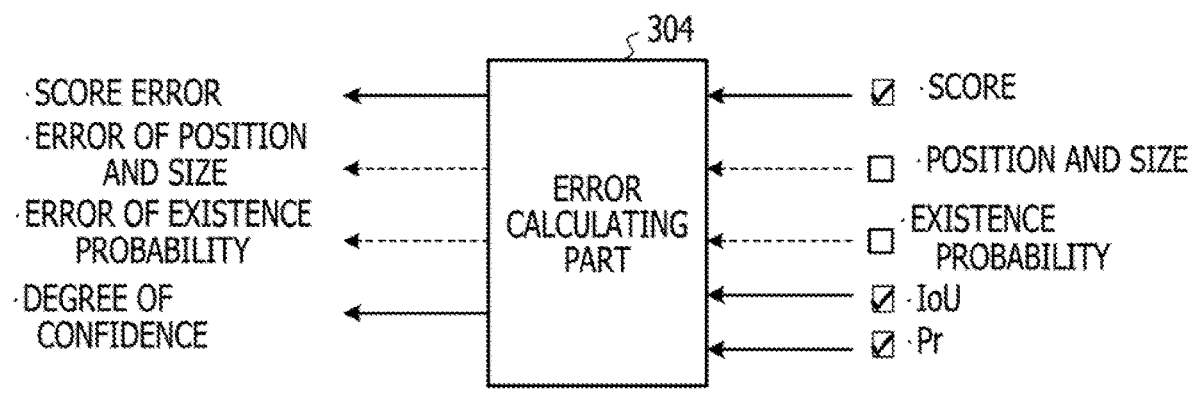
FIG. 9 is a diagram illustrating a specific example of processing of an error calculating part.

FIG. 9 illustrates a specific example of processing of the error calculating part. As illustrated in FIG. 9, information related to the score and the object (the position and the size, the existence probability, the IoU, and the Pr) that is calculated when the inferring part 303 infers the label as a result of the refine image being inputted is inputted to the error calculating part 304.

As illustrated in FIG. 9, the error calculating part 304 calculates a score error and an object error, using the inputted information related to the score and the object. For example, the error calculating part 304 calculates the score error that is the error between the score when making inference using the generated refine image and the maximized correct label score, and also calculates following items as the object error that is the error between the information related to the object when inferring the label using the generated refine image and the correct information related to the correct label object:

an error of the position and the size, an error of the existence probabilities (=(a difference between the existence probability of a region where the object exists and 1.0)+(a difference between the existence probability of a region where the object does not exist and 0.0)), and a degree of confidence (=IoU×Pr).

The error calculating part 304 may preset an item to be used in calculation of the score error or the object error, of the information related to the score and the object notified by the inferring part 303. The example of FIG. 9 illustrates that the error calculating part 304 notifies the score error and the degree of confidence to the image refiner part 301 because setting is such that the score, the IoU, and the Pr are inputted to the error calculating part 304.

(2) Specific Example of Processing of Attention Degree Map Generating Section

Figure 10A:
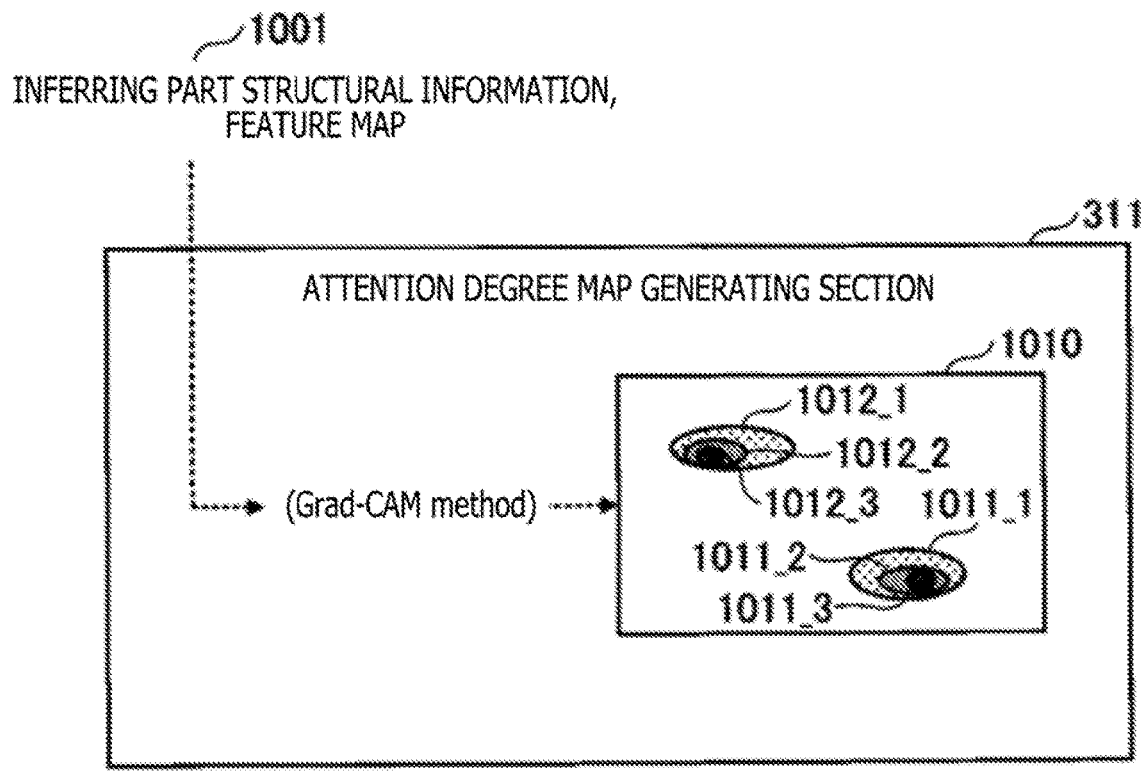
FIGS. 10A and 10B are diagrams illustrating a specific example of processing of an attention degree map generating section.
Figure 10B:
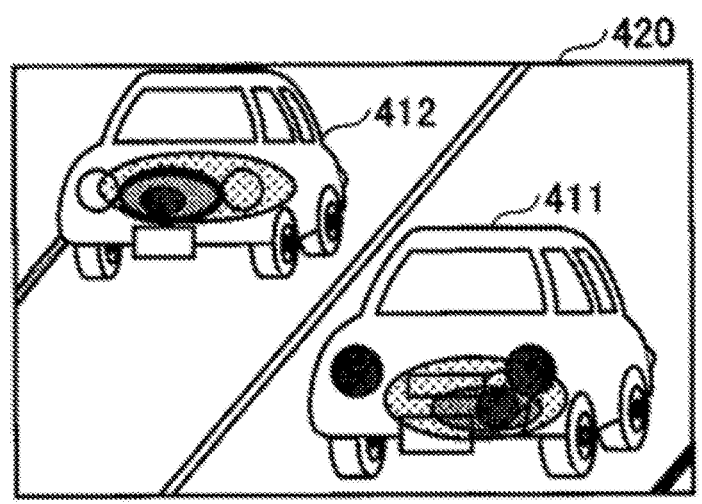

Next, a specific example of processing of the attention degree map generating section 142 is described. FIGS. 10A and 10B are diagrams illustrating a specific example of the processing of the attention degree map generating section. As illustrated in FIG. 10A, upon acquisition of inferring part structural information and a feature map 1001, the attention region deriving part 311 generates an attention degree map 1010 using the Grad-CAM method.

As described above, since the score-maximized refine image 420 includes two objects (vehicles 411 and 412), pixel regions with the same level of attention degree appear at the positions corresponding to the respective objects in the attention degree map 1010.

In FIG. 10A, regions 1011_1 and 1012_1 indicate pixel regions with the attention degree of level 1 or higher. Similarly, regions 1011_2 and 1012_2 indicate pixel regions with the attention degree of level 2 or higher. Similarly, regions 1011_3 and 1012_3 indicate pixel regions with the attention degree of level 3 or higher.

FIG. 10B illustrates that, in order to clarify to which position on the score-maximized refine image 420 each region included in the attention degree map 1010 corresponds, the attention degree map 1010 is superimposed on the score-maximized refine image 420.

In the example of FIG. 10B, the regions 1011_1 to 1011_3 indicate the superimposition from the front grille to the lower side of the left headlight of the vehicle 411. Similarly, the regions 1012_1 to 1012_3 indicate the superimposition from a part of the right headlight to the front grille and the left headlight of the vehicle 412.

(3) Specific Example of Processing of Detailed Cause Analyzing Section

Next, a specific example of the processing of the detailed cause analyzing section 143 is described. First, the functional configuration of the detailed cause analyzing section 143 is described.

(3-1) Functional Configuration of Detailed Cause Analyzing Section

Figure 11:
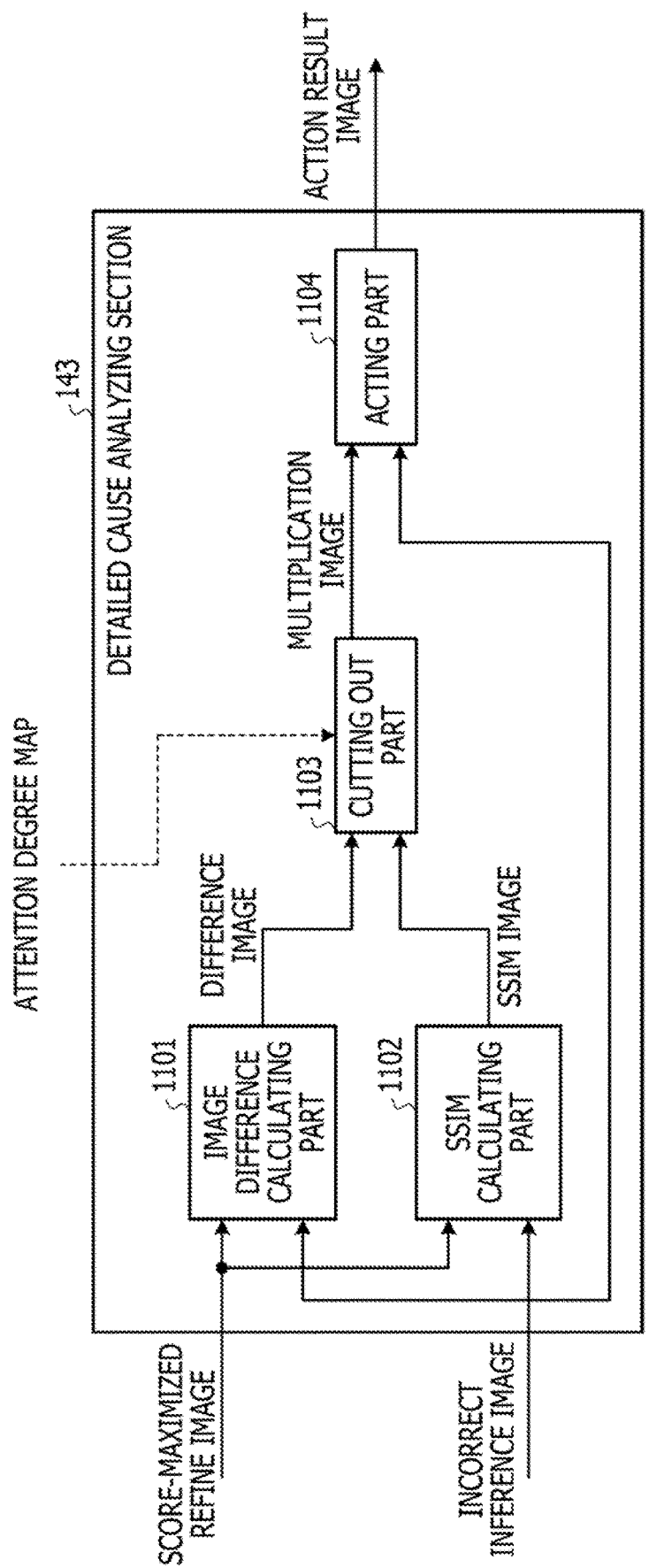
FIG. 11 is a first diagram illustrating an example of a functional configuration of a detailed cause analyzing section.

FIG. 11 is a first diagram illustrating an example of the functional configuration of the detailed cause analyzing section. As illustrated in FIG. 11, the detailed cause analyzing section 143 includes an image difference calculating part 1101, an SSIM calculating part 1102, a cutting out part 1103, and an acting part 1104.

The image difference calculating part 1101 calculates a difference between a score-maximized refine image and an incorrect inference image for each pixel and outputs a difference image.

The SSIM calculating part 1102 performs SSIM calculation using the score-maximized refine image and the incorrect inference image 410 to output an SSIM image.

The cutting out part 1103 cuts out an image portion corresponding to a predetermined level region of the attention degree map 1010 from the difference image. The cutting out part 1103 cuts out an image portion corresponding to a predetermined level region of the attention degree map 1010 from the SSIM image. The cutting out part 1103 multiplies the difference image and the SSIM image, from which the image portions corresponding to the predetermined level regions of the attention degree map 1010 have been cut out, to generate a multiplication image.

The acting part 1104 generates an action result image based on the incorrect inference image and the multiplication image.

(3-2) Specific Example of Processing of Detailed Cause Analyzing Section

Figure 12:
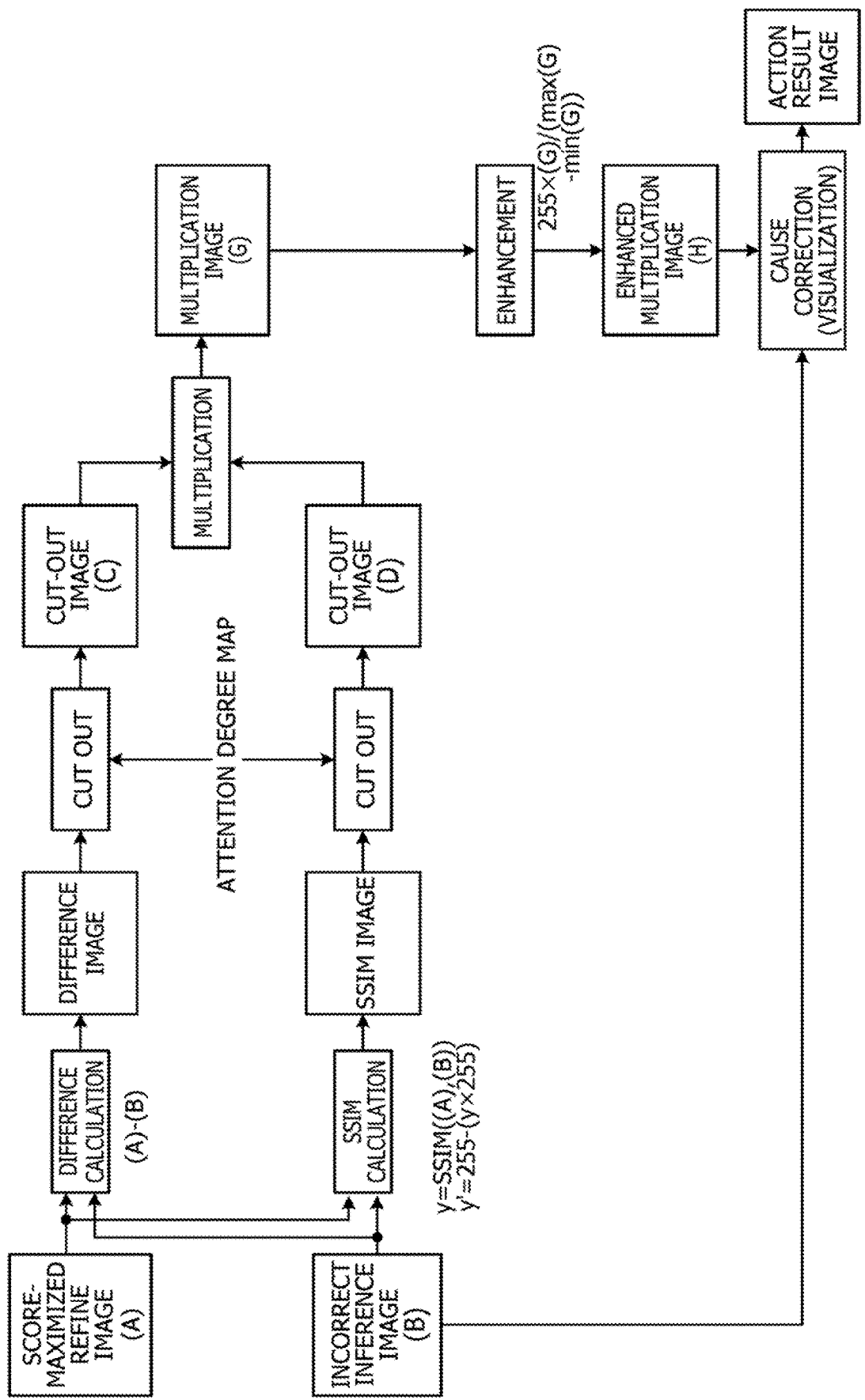
FIG. 12 is a first diagram illustrating a specific example of processing of the detailed cause analyzing section.

FIG. 12 illustrates a specific example of the processing of the detailed cause analyzing section. As illustrated in FIG. 12, first, the image difference calculating part 1101 calculates a difference between the score-maximized refine image (A) and the incorrect inference image (B) (=(A)−(B)) and outputs a difference image. The difference image is pixel correction information in an image section that causes incorrect inference.

Subsequently, the SSIM calculating part 1102 performs SSIM calculation based on the score-maximized refine image (A) and the incorrect inference image (B) (y=SSIM((A), (B))). The SSIM calculating part 1102 outputs an SSIM image by inverting the result of the SSIM calculation (y'=255−(y×255)). The SSIM image is an image designating an image section that causes incorrect inference with high precision; a larger pixel value represents a larger difference and a smaller pixel value represents a smaller difference. The process of inverting the result of the SSIM calculation may be performed by calculating y'=1−y, for example.

Subsequently, the cutting out part 1103 cuts out an image portion corresponding to a predetermined level region of the attention degree map from the difference image to output a cut-out image (C). Similarly, the cutting out part 1103 cuts out an image portion corresponding to a predetermined level region of the attention degree map from the SSIM image to output a cut-out image (D).

The predetermined level region of the attention degree map is a region obtained by narrowing down an image portion that causes incorrect inference to a region, and the detailed cause analyzing section 143 is intended to further perform cause analysis at a pixel-size level in the narrowed-down region.

For this reason, the cutting out part 1103 multiplies the cut-out image (C) and the cut-out image (D) to generate a multiplication image (G). The multiplication image (G) is nothing other than pixel correction information obtained by designating the pixel correction information at an image section that causes incorrect inference with much higher precision.

The cutting out part 1103 performs an enhancing process on the multiplication image (G) for each pixel to output an enhanced multiplication image (H). The cutting out part 1103 calculates the enhanced multiplication image (H) based on the following equation.

$$\text{Enhanced multiplication image } (H) = 255 \times (G)/(\max(G) - \min(G)) \quad \text{(Equation 3)}$$

Subsequently, the acting part 1104 subtracts the enhanced multiplication image (H) from the incorrect inference image (B) to visualize an important portion for each pixel and generates an action result image.

The method for the enhancing process illustrated in FIG. 12 is only an example and the enhancing process may be performed by another method as long as the method makes it easier to distinguish an important portion after visualization.

<Flow of Incorrect Inference Cause Extracting Process>

Figure 13:
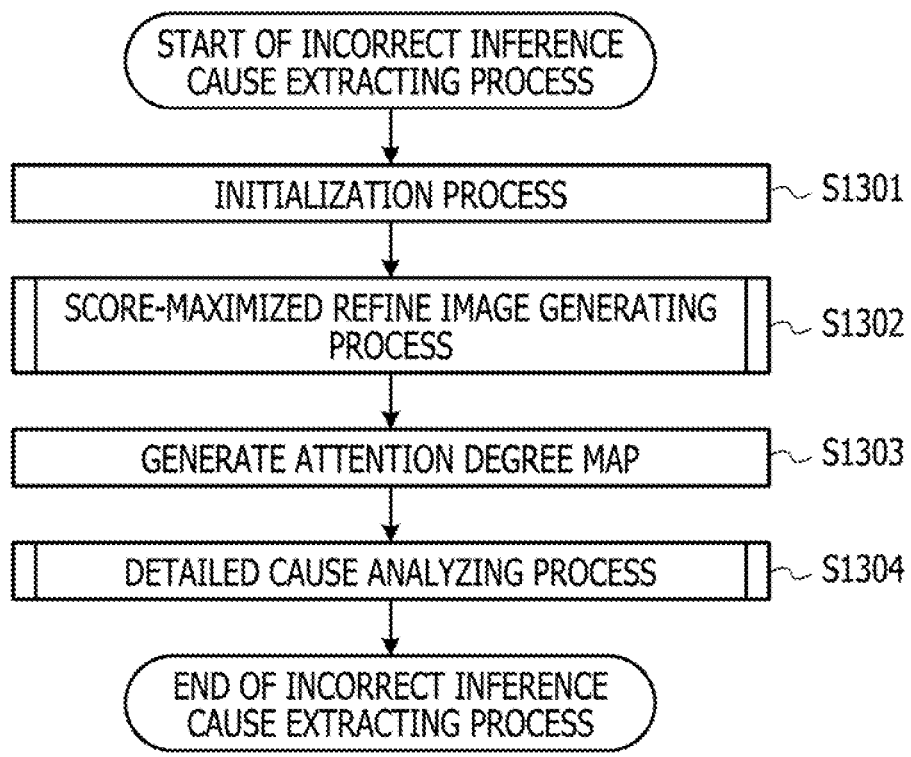
FIG. 13 is a first flowchart illustrating the flow of an incorrect inference cause extracting process.

Next, the flow of an incorrect inference cause extracting process performed by the incorrect inference cause extracting unit 140 is described. FIG. 13 is a first flowchart illustrating the flow of the incorrect inference cause extracting process.

In step S1301, the components of the incorrect inference cause extracting unit 140 perform an initialization process. For example, the image refiner part 301 sets the number of training iterations for the CNN to zero and sets the maximum number of training iterations to a value instructed by the user. The image refiner part 301 sets a mode (any of a mode of maximizing a score targeted for all objects or a mode of maximizing a score targeted for an Individual object) in generating a score-maximized refine image. The error calculating part 304 sets information used to calculate the object error, of the information related to the object.

In step S1302, the image refiner part 301 performs a score-maximized refine image generating process. The score-maximized refine image generating process is described below in detail.

In step S1303, the attention degree map generating section 142 generates an attention degree map using the Grad-CAM method based on the inferring part structural information and the feature map.

In Step S1304, the detailed cause analyzing section 143 performs a detailed cause analyzing process. The detailed cause analyzing process is described in detail later.

<Details of Score-Maximized Refine Image Generating Process>

Figure 14:
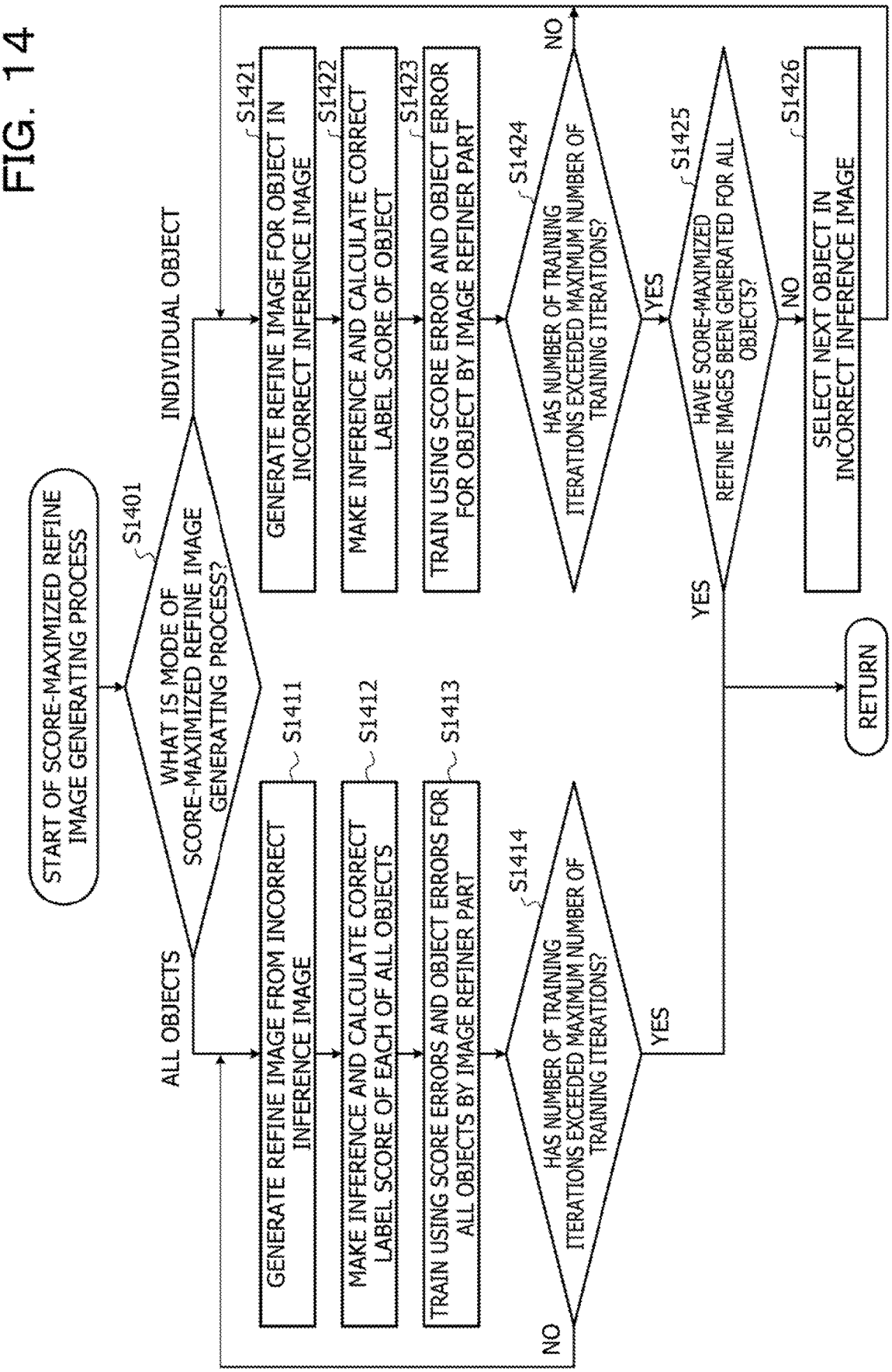
FIG. 14 is a flowchart illustrating the flow of a score-maximized refine image generating process.

Next, the score-maximized refine image generating process (step S1302) of the incorrect inference cause extracting process (FIG. 13) is described in detail. FIG. 14 is a flowchart illustrating the flow of the score-maximized refine image generating process.

In step S1401, the image refiner part 301 determines the mode of the score-maximized refine image generating process. In step S1401, when the image refiner part 301 determines that the mode of maximizing a score targeted for all objects is set, the process proceeds to step S1411.

In step S1411, the image refiner part 301 generates a refine image from the incorrect inference image and stores the refine image in the refine image storing part 305.

In step S1412, the inferring part 303 inputs the refine image to infer a label and calculates correct label scores of all the objects.

In step S1413, the image refiner part 301 performs the CNN training, using score errors and object errors for all the objects that are calculated by the error calculating part 304, and the image difference value calculated by the image error calculating part 302.

In step S1414, the image refiner part 301 determines whether or not the number of training iterations has exceeded the maximum number of training iterations. When the number of training iterations is determined in step S1414 not to have exceeded the maximum number of training iterations (No in step S1414), the process returns to step S1411 to continue the generation of a refine image.

On the other hand, when the number of training iterations is determined in step S1414 to have exceeded the maximum number of training iterations (Yes in step S1414), the process returns to step S1303 of FIG. 13. At this time, one score-maximized refine image is stored in the refine image storing part 305.

On the other hand, when it is determined in step S1401 that the mode of maximizing a score targeted for an individual object is set, the process proceeds to step S1421.

In step S1421, the image refiner part 301 generates a refine image for the predetermined one object in the incorrect inference image and stores the refine image in the refine image storing part 305.

In step S1422, the inferring part 303 inputs the refine image to infer a label and calculates a correct label score of the predetermined one object.

In step S1423, the image refiner part 301 performs the CNN training, using the score error and object error for the predetermined one object that are calculated by the error calculating part 304, and the image difference value calculated by the image error calculating part 302.

In step S1424, the image refiner part 301 determines whether or not the number of training iterations has exceeded the maximum number of training iterations. When the number of training iterations is determined in step S1424 not to have exceeded the maximum number of training iterations (No in step S1424), the process returns to step S1421 to continue the generation of a refine image.

On the other hand, when the number of training iterations is determined in step S1424 to have exceeded the maximum number of training iterations (Yes in step S1424), the process proceeds to step S1425. At this time, the score-maximized refine image for the predetermined one object is stored in the refine image storing part 305.

In step S1425, the image refiner part 301 determines whether or not score-maximized refine images are generated for all the objects included in the incorrect inference image.

When it is determined in step S1425 that there is an object for which no score-maximized refine image has been generated yet (No in step S1425), the process proceeds to step S1426.

In step S1426, the image refiner part 301 selects, as a predetermined one object, a next object for which the score-maximized refine image is to be generated, and the process returns to step S1421.

On the other hand, when it is determined in step S1425 that the score-maximized refine images have been generated for all the objects (Yes in step S1425), the process returns to step S1303 of FIG. 13. At this time, the score-maximized refine images, the number of which corresponds to the number of objects, are stored in the refine image storing part 305.

<Flow of Detailed Cause Analyzing Process>

Figure 15:
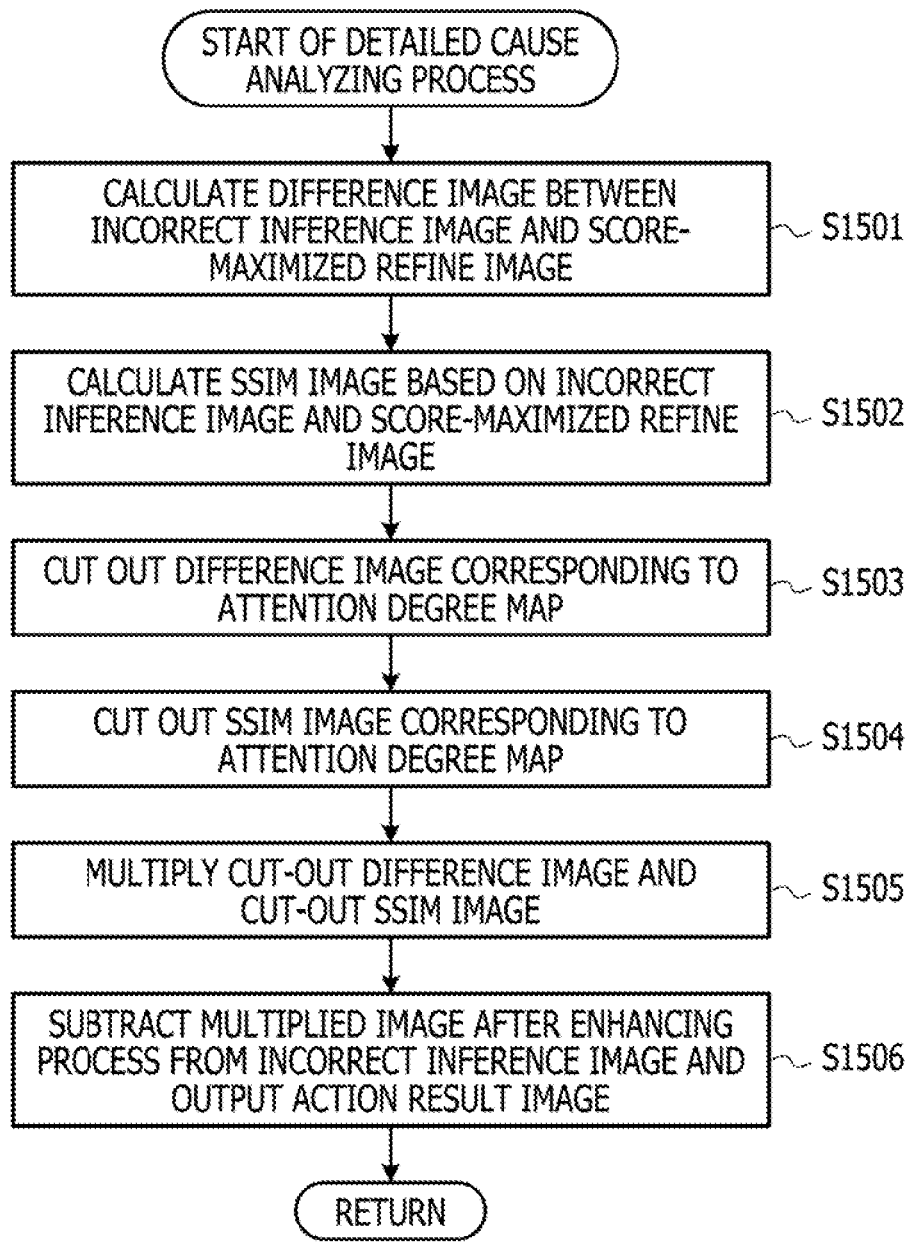
FIG. 15 is a first flowchart illustrating the flow of the detailed cause analyzing process.

Next, the flow of the detailed cause analyzing process performed by the detailed cause analyzing section 143 is described. FIG. 15 is a first flowchart illustrating the flow of the detailed cause analyzing process.

In step S1501, the image difference calculating part 1101 calculates a difference image between a score-maximized refine image and an incorrect inference image.

In step S1502, the SSIM calculating part 1102 calculates an SSIM image based on the score-maximized refine image and the incorrect inference image.

In step S1503, the cutting out part 1103 cuts out a difference image corresponding to a predetermined level region of an attention degree map.

In step S1504, the cutting out part 1103 cuts out an image portion corresponding to a predetermined level region of the attention degree map from the SSIM image.

In step S1505, the cutting out part 1103 multiplies the cut out difference image and the cut out SSIM image to generate a multiplication image.

In step S1506, the cutting out part 1103 performs an enhancing process for each pixel on the multiplication image. The acting part 1104 subtracts the multiplication image subjected to the enhancing process from the incorrect inference image to output an action result image.

<Specific Example of Incorrect Inference Cause Extracting Process>

Figure 16:
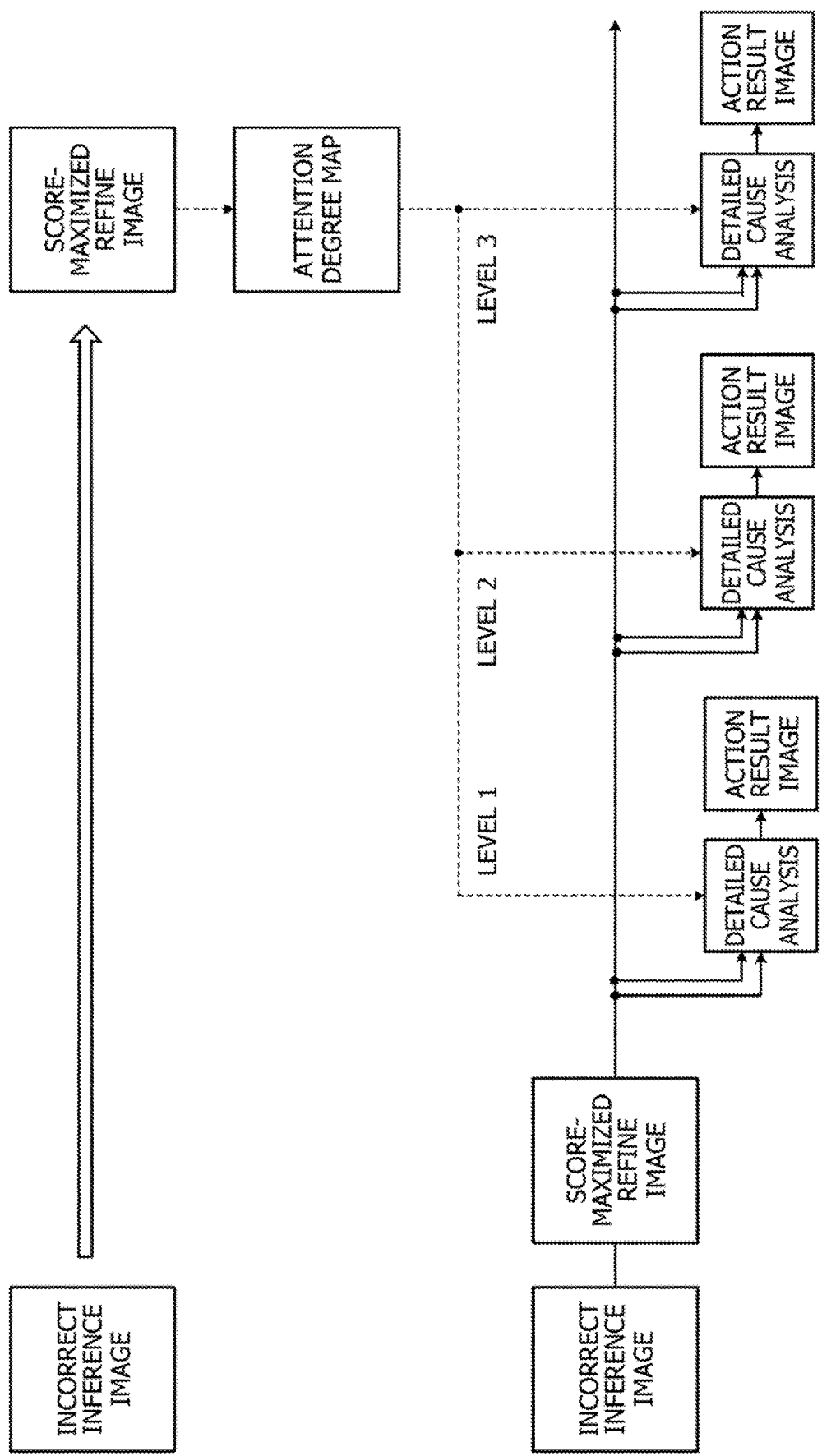
FIG. 16 is a first diagram illustrating a specific example of the incorrect inference cause extracting process.

Next, a specific example of the incorrect inference cause extracting process performed by the incorrect inference cause extracting unit 140 is described. FIG. 16 is a first diagram illustrating the specific example of the incorrect inference cause extracting process.

As Illustrated in FIG. 16, first, the refine image generating section 141 generates a score-maximized refine image from an incorrect inference image. Subsequently, the attention degree map generating section 142 generates an attention degree map.

When the refine image generating section 141 generates one score-maximized refine image, the attention degree map generating section 142 generates one attention degree map. When the refine image generating section 141 generates score-maximized refine images, the number of which corresponds to the number of objects, the attention degree map generating section 142 generates a corresponding number of attention degree maps and combines those maps to generate one attention degree map.

Subsequently, the detailed cause analyzing section 143 reads the score-maximized refine image and the incorrect inference image, and performs a detailed cause analyzing process based on the generated one attention degree map to output an action result image.

The detailed cause analyzing section 143 performs the detailed cause analyzing process on a pixel region of level 1 or higher, a pixel region of level 2 or higher, and a pixel region of level 3 or higher, for example, in the one attention degree map, and outputs action result images.

As is clear from the above description, the analysis apparatus 100 according to the first embodiment generates the score-maximized refine image having the maximized correct label score of inference, from the incorrect inference image by which an incorrect label is inferred in the image recognition process.

The analysis apparatus 100 according to the first embodiment generates the attention degree map indicating a region of pixels with the same level of attention degree, which have drawn attention at the time of inference, of a plurality of the pixels in the score-maximized refine image.

The analysis apparatus 100 according to the first embodiment cuts out an image corresponding to a predetermined level region of the attention degree map from the image calculated based on the incorrect inference image and the score-maximized refine image. The analysis apparatus 100 according to the first embodiment visualizes the image section that causes incorrect inference by performing an enhancing process for each pixel on the cut out image.

Accordingly, It is possible to improve the precision at the time of specifying an image section that causes incorrect inference by performing the enhancing process for each pixel with respect to the predetermined level region of the attention degree map in the image calculated based on the incorrect inference image and the score-maximized refine image.

Second Embodiment

In the aforementioned first embodiment, the description is given on the assumption that incorrect inference cause extracting process is performed on the input image extracted as the incorrect inference image by the incorrect inference image extracting unit 120. However, the input image on which the incorrect inference cause extracting process is performed is not limited to the input image extracted as the incorrect inference image by the incorrect inference image extracting unit 120.

For example, the incorrect inference image extracting unit 120 may perform the incorrect inference cause extracting process on the incorrect inference image that does not match the correct label by deforming a part of an input image (referred to as a correct inference image) that is determined to match the correct label.

In this case, the incorrect inference cause extracting process is performed using the correct inference image as the score-maximized refine image. For example, in the incorrect inference cause extracting unit 140, the process of generating a score-maximized refine image by the refine image generating section 141 may be omitted.

Third Embodiment

Although, in the aforementioned first embodiment, the description is given of the case where the incorrect inference image includes two objects, the number of objects included in the incorrect inference image is not limited to two, but may be one or three or more.

In the aforementioned first embodiment, the description is given on the assumption that the detailed cause analyzing process is performed for each level region of the attention degree map. However, the method of the detailed cause analyzing process is not limited thereto. For example, a different level may be set for each of the objects included in the incorrect inference image, and the detailed cause analyzing process may be performed on a region of the set level.

Fourth Embodiment

In the aforementioned first to third embodiments, the description is given on the assumption that the region to be cut out in the detailed cause analyzing process is determined based on the attention degree map generated using the Grad-CAM method. However, the method of determining the region to be cut out in the detailed cause analyzing process is not limited thereto, and the region may be determined using a map generated using another analysis technique.

In the aforementioned first to third embodiments, the description is given of the case where the image portion corresponding to the predetermined level region of the attention degree map is cut out. However, the region to be cut out is not limited to the predetermined level region of the attention degree map, and for example, the incorrect inference image may be divided into superpixels and cut out for each superpixel.

Hereinafter, a fourth embodiment is described by focusing on a difference from the above-described first to third embodiments.

<Functional Configuration of Incorrect Inference Cause Extracting Unit>

Figure 17:
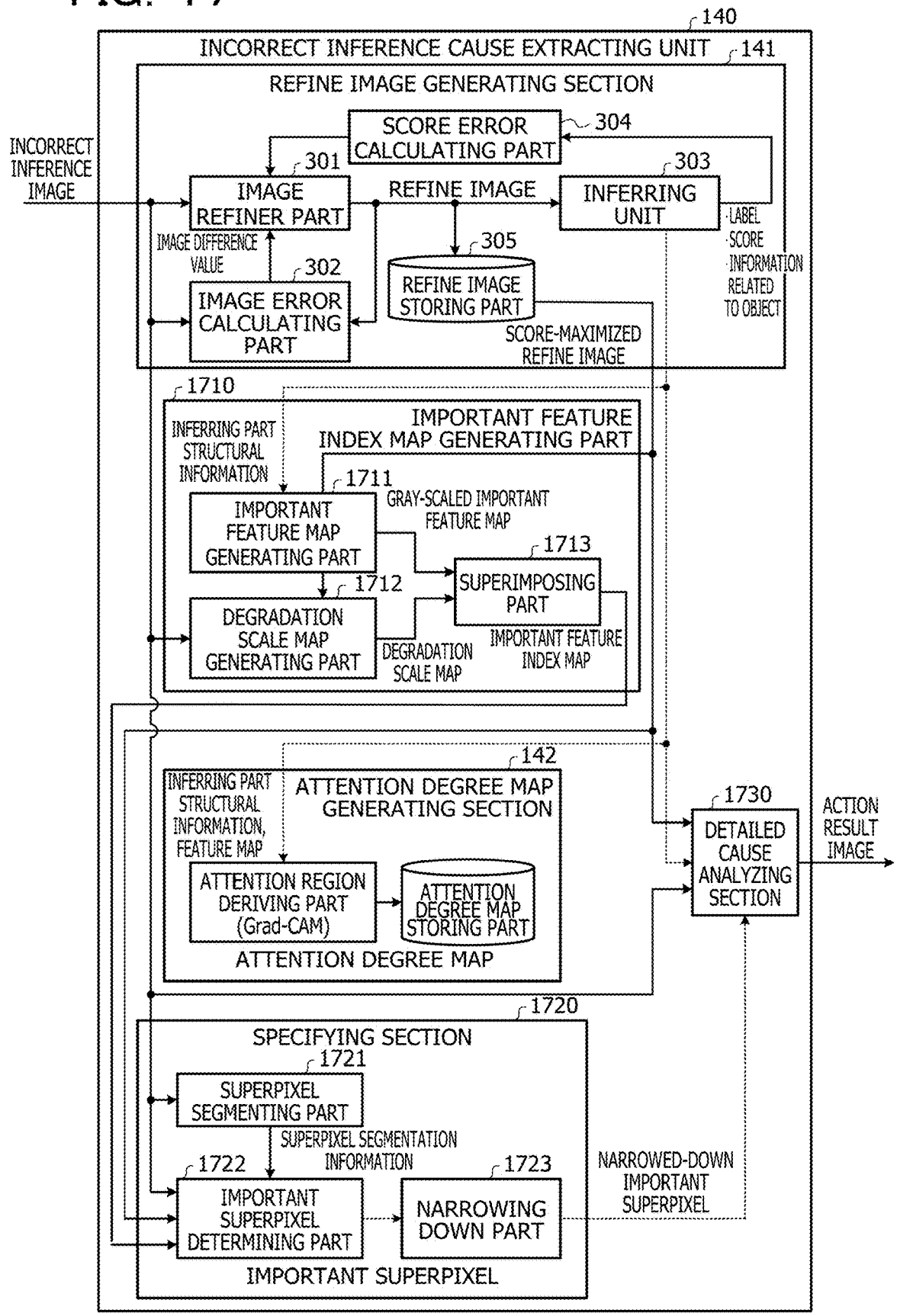
FIG. 17 is a second diagram illustrating an example of the functional configuration of the incorrect inference cause extracting unit.

First, a functional configuration of an incorrect inference cause extracting unit 140 in an analysis apparatus 100 according to the fourth embodiment is described. FIG. 17 is a second diagram illustrating an example of the functional configuration of the incorrect inference cause extracting unit. The functional configuration illustrated in FIG. 17 is different from the functional configuration described with reference to FIG. 3 in including an important feature index map generating section 1710 and a specifying section 1720 and also including a detailed cause analyzing section 1730 having a function different from that of the detailed cause analyzing section 143.

The important feature index map generating section 1710, the specifying section 1720, and the detailed cause analyzing section 1730 are described in detail below.

(1) Details of Important Feature Index Map Generating Section

First, the important feature index map generating section 1710 is described in detail. As illustrated in FIG. 17, the important feature index map generating section 1710 includes an important feature map generating part 1711, a degradation scale map generating part 1712, and a superimposing part 1713.

The important feature map generating part 1711 acquires, from the inferring part 303, inferring part structural information at the time of inferring a label with the score-maximized refine image as an input. The important feature map generating part 1711 generates a "gray-scaled important feature map" using the back propagation (BP) method, the guided back propagation (GBP) method, or a selective BP method. The gray-scaled important feature map is a map gray-scaled to indicate an attention degree of each of pixels that has drawn attention at the time of inference, of a plurality of the pixels in the score-maximized refine image.

The BP method is a method of visualizing a feature portion, by calculating an error of each label from each score that is obtained by making inference of input image whose inferred label is correct (here, the score-maximized refine image) and imaging the magnitude of gradient information that is obtained by back-propagating to an input layer. The GBP method is a method of visualizing a feature portion by imaging only a positive value of the magnitude of the gradient information.

The selective BP method is a method of maximizing only an error of a correct label and then performing processing using the BP method or the GBP method. In the case of the selective BP method, only a feature portion that affects the correct label score is visualized.

The degradation scale map generating part 1712 generates a "degradation scale map" based on an incorrect inference image and a score-maximized refine image. The degradation scale map indicates a degree of change of each pixel that is changed when the score-maximized refine image is generated.

The superimposing part 1713 generates an "Important feature index map" by superimposing the gray-scaled important feature map generated by the important feature map generating part 1711 and the degradation scale map generated by the degradation scale map generating part 1712. The important feature index map indicates a degree of importance of each pixel for inferring a correct label.

(2) Details of Specifying Section

Next, the specifying section 1720 is described in detail. As illustrated in FIG. 17, the specifying section 1720 includes a superpixel segmenting part 1721, an important superpixel determining part 1722, and a narrowing down part 1723.

The superpixel segmenting part 1721 segments the incorrect inference image into "superpixels" which are regions of each element object (each component of a vehicle in this embodiment) of an object (the vehicle in this embodiment) contained in the incorrect inference image, and outputs superpixel segmentation information. In segmenting the incorrect inference image into superpixels, an existing segmentation function is utilized, or CNN or the like trained to segment for each component of the vehicle is utilized.

The important superpixel determining part 1722 is an example of an extracting part, which adds up, for each superpixel, pixel values of respective pixels in the important feature index map generated by the superimposing part 1713 based on the superpixel segmentation information outputted by the superpixel segmenting part 1721.

The important superpixel determining part 1722 extracts superpixels, each having an added value that satisfies a predetermined condition (being larger than or equal to an important feature index threshold) among the superpixels, and notifies the extracted superpixels (important superpixels) to the narrowing down part 1723.

The narrowing down part 1723 reads the attention degree map from the attention degree map storing part 312, and narrows down the important superpixels included in a predetermined level region of the attention degree map among the important superpixels notified from the important superpixel determining part 1722.

The narrowing down part 1723 notifies the detailed cause analyzing section 1730 of the narrowed-down important superpixels as the narrowed-down important superpixels.

(3) Details of Detailed Cause Analyzing Section

Next, the detailed cause analyzing section 1730 is described in detail. The detailed cause analyzing section 1730 acquires a score-maximized refine image, an incorrect inference image, and inferring part structural information. The detailed cause analyzing section 1730 cuts out a region corresponding to the narrowed-down important superpixels from the important feature map generated based on the score-maximized refine image, the incorrect inference image, and the inferring part structural information, and performs an enhancing process for each pixel. As such, the detailed cause analyzing section 1730 outputs an action result image in which the image section that causes incorrect inference is visualized.

<Specific Example of Process of Each Component of Incorrect Inference Cause Extracting Unit>

Specific examples of processing of the components (the important feature index map generating section 1710, the specifying section 1720, and the detailed cause analyzing section 1730) of the incorrect inference cause extracting unit 140 are described. In the following, description is given on the assumption that an incorrect inference image includes a plurality of objects (plurality of vehicles) as an inference target.

Figure 18:
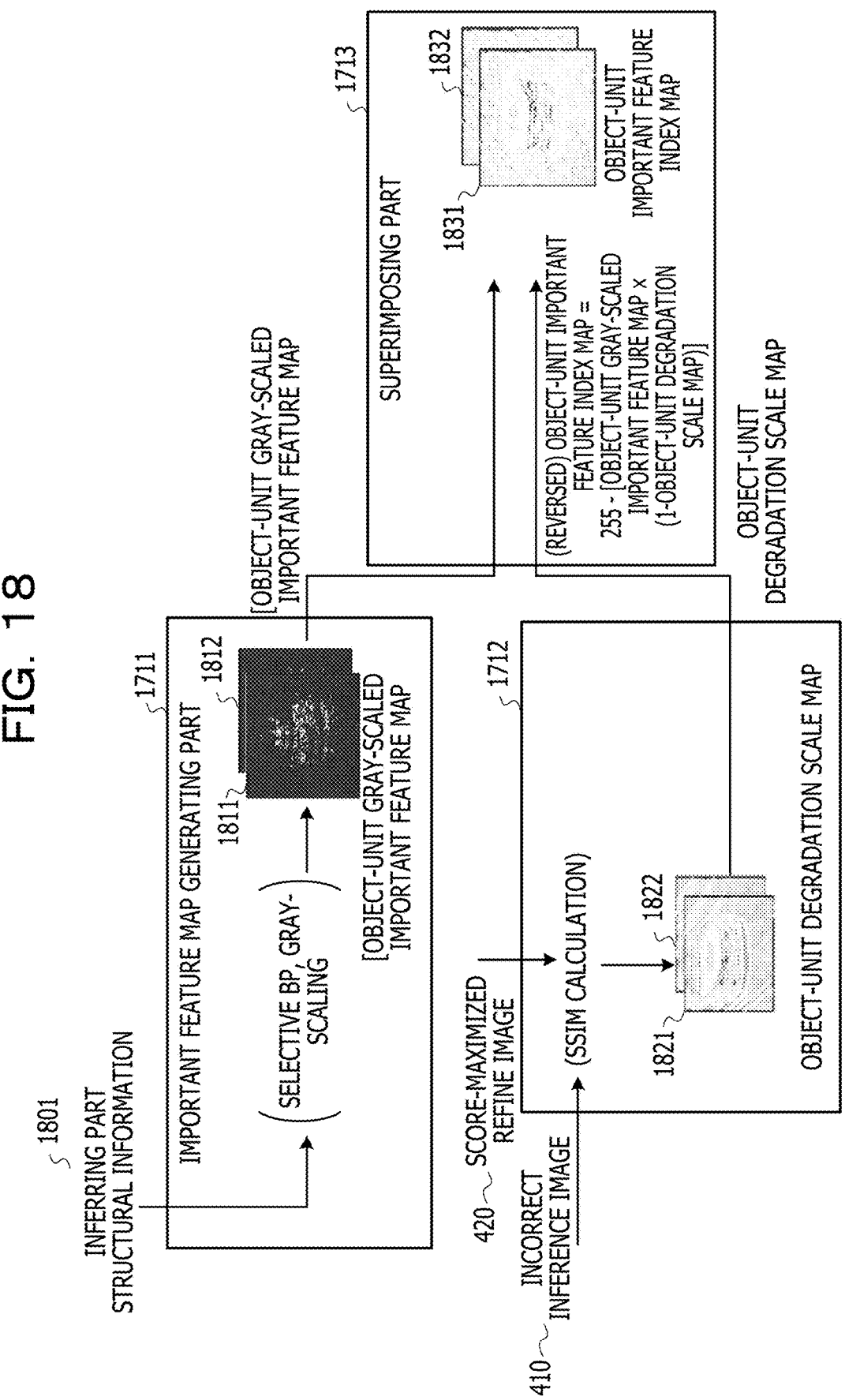
FIG. 18 is a diagram illustrating a specific example of processing of an important feature index map generating section.

(1) Specific Example of Processing of Important Feature Index Map Generating Section (1-1) Specific Examples of Processing of Important Feature Map Generating Part, Degradation Scale Map Generating Part, and Superimposing Part First, description is given of specific examples of processing of the important feature map generating part 1711, the degradation scale map generating part 1712, and the superimposing part 1713 included in the important feature index map generating section 1710. FIG. 18 is a diagram illustrating a specific example of processing of the important feature index map generating section.

As illustrated in FIG. 18, in the important feature index map generating section 1710, the important feature map generating part 1711 acquires, from the inferring part 303, inferring part structural information 1801 at the time when the inferring part 303 inputs a score-maximized refine image to infer a correct label. The important feature map generating part 1711 generates an important feature map using the selective BP method, for example, based on the acquired inferring part structural information 1801.

The important feature map generating part 1711 generates an important feature map for each object included in the score-maximized refine image. Because the score-maximized refine image 420 includes two objects of the vehicle 411 and the vehicle 412, the important feature map generating part 1711 generates two important feature maps using the selective BP method (details of which are discussed below).

The important feature map generating part 1711 gray-scales the two important feature maps generated for the two objects and generates object-unit gray-scaled important feature maps 1811 and 1812.

The object-unit gray-scaled important feature maps 1811 and 1812 illustrated in FIG. 18 are each gray-scaled with pixel values of 0 to 255. Hence, in the object-unit gray-scaled important feature maps 1811 and 1812, pixels having pixel values close to 255 are pixels with a high attention degree (attention-drawing pixels) at the time of inference, and pixels having pixel values close to 0 are pixels with a low attention degree (non-attention drawing pixels) at the time of the inference.

On the other hand, the degradation scale map generating part 1712 reads the score-maximized refine image 420 from the refine image storing part 305 and performs the structural similarity (SSIM) calculation between the score-maximized refine image 420 and the incorrect inference image 410, for each object.

Because the score-maximized refine image 420 includes the two objects of the vehicle 411 and the vehicle 412, the degradation scale map generating part 1712 generates two object-unit degradation scale maps 1821 and 1822. The object-unit degradation scale maps 1821 and 1822 take values from 0 to 1, and indicate that the closer to 1 the pixel value is, the smaller the degree of change is, while the closer to 0 the pixel value is, the larger the degree of change is.

The superimposing part 1713 acquires the object-unit gray-scaled important feature maps 1811 and 1812 generated by the important feature map generating part 1711 and the object-unit degradation scale maps 1821 and 1822 generated by the degradation scale map generating part 1712. The superimposing part 1713 generates object-unit important feature index maps 1831 and 1832.

For example, the superimposing part 1713 generates the object-unit important feature index maps 1831 and 1832 based on the following equation.

$$\text{Object-unit important feature index map} = \text{object-unit gray-scaled important feature map} \times (1 - \text{object-unit degradation scale map}) \quad \text{(Equation 3)}$$

In the above equation, the term (1−object-unit degradation scale map) takes a value from 0 to 1, and indicates that the degree of change is larger as the value is closer to 1, and is smaller as the value is closer to 0. For example, the object-unit important feature index maps 1831 and 1832 are generated by adding intensity of the degree of change to the object-unit gray-scaled important feature map that indicates the attention degree of each pixel that draws attention at the time of inference.

For example, the object-unit important feature index maps 1831 and 1832 are generated by reducing the pixel values of the object-unit gray-scaled important feature map for portions where the degree of change is small in the object-unit degradation scale maps 1821 and 1822 and by increasing the pixel values of the object-unit gray-scaled important feature maps for portions where the degree of change is large in the object-unit degradation scale maps 1821 and 1822.

To facilitate visualization, the object-unit important feature index map may be inverted. The object-unit important feature index map illustrated in FIG. 18 is inverted based on the following equation.

$$(\text{inverted})\text{Object-unit important feature index map} = 255 - [\text{object-unit gray-scaled important feature map} \times (1 - \text{object-unit degradation scale map})] \quad \text{(Equation 4)}$$

The advantages of the superimposing part 1713 superimposing the object-unit gray-scaled important feature maps 1811 and 1812 and the object-unit degradation scale maps 1821 and 1822 based on the above equation are described.

As described above, the object-unit gray-scaled important feature maps 1811 and 1812 generated by the important feature map generating part 1711 are nothing less than attention portions that draw attention of the inferring part 303 when the correct label score is maximized.

On the other hand, the object-unit degradation scale maps 1821 and 1822 generated by the degradation scale map generating part 1712 each represent a changed portion when an incorrect inference image is changed such that the correct label score is maximized, and each represent a portion that causes incorrect inference. Nevertheless, the object-unit degradation scale maps 1821 and 1822 generated by the degradation scale map generating part 1712 are not minimum portions for inferring the correct label.

The superimposing part 1713 visualizes the minimum portions for inferring the correct label as an important portion for inferring a correct label, by superimposing the changed portions when the incorrect inference image is changed such that the correct label score is maximized and the attention portions that draw attention of the inferring part 303.

The example of FIG. 18 illustrates a case where the image refiner part 301 generates the score-maximized refine image with the second generation method. As illustrated in FIG. 18, in the case of the second generation method, since the degradation scale map is generated for each object, superimposing the degradation scale map on the corresponding object-unit gray-scaled important feature map generates the object-unit important feature index map.

On the other hand, when the image refiner part 301 generates the score-maximized refine image with the first generation method, the degradation scale map generating part 1712 generates a degradation scale map that includes all objects and has a size of 1. In this case, using the degradation scale map of 1 in common, the superimposing part 1713 superimposes the object-unit gray-scaled important feature map of each of the objects. As such, the object-unit important feature index map is generated.

(1-2) Details of Method of Generating Important Feature Map Using Selective BP Method Next, a generation method of the important feature map generating part 1711 generating an important feature map for each object by means of the selective BP method is described in detail. As described above, the important feature map generating part 1711 generates an important feature map for each object included in the score-maximized refine image.

Figure 19A:
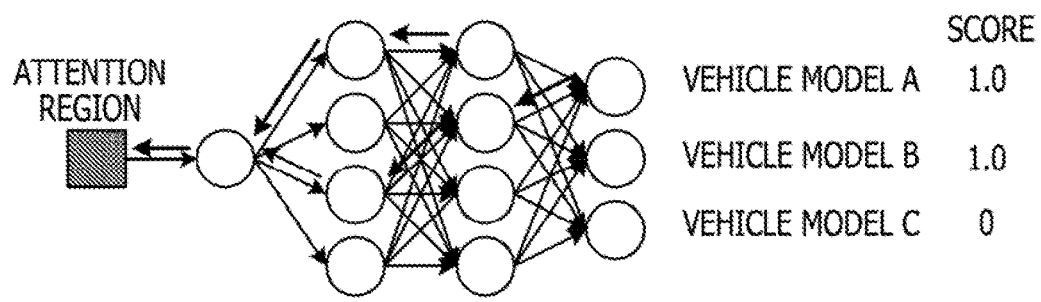
FIGS. 19A and 19B are diagrams illustrating an example of a method of generating an important feature map using a selective BP method.
Figure 19B:
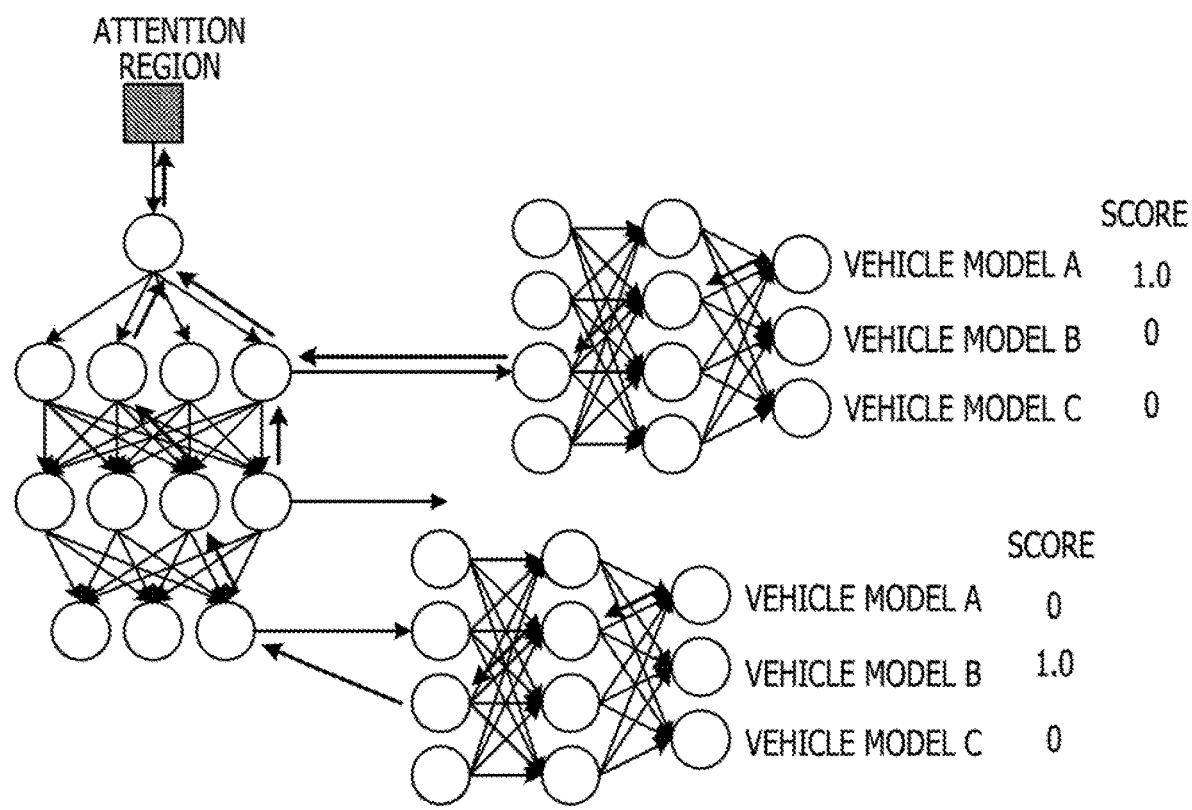

FIGS. 19A and 19B are diagrams illustrating an example of the method of generating an important feature map using the selective BP method. FIG. 19A illustrates a case where important feature maps are generated for all of the objects included in the score-maximized refine image 420.

As described above, the score-maximized refine image 420 includes the two objects (the vehicles 411 and 412) that are of different vehicle models from each other. Consequently, simultaneously using the selective BP method on the two objects generates an important feature map in which pieces of information on attention regions of the two objects are mutually mixed.

On the other hand, FIG. 19B illustrates a case where important feature maps are generated separately for the two objects included in the score-maximized refine image 420. As illustrated in FIG. 19B, using the selective BP method separately on the two objects makes it possible to generate an important feature map in which pieces of information on the attention regions of the two objects are not mixed.

As such, the important feature map generating part 1711 separately generates an important feature map for each object included in the score-maximized refine image.

(2) Specific Example of Processing of Specifying Section

Specific examples of processing of the components of the specifying section 1720 (the superpixel segmenting part 1721, the important superpixel determining part 1722, and the narrowing down part 1723) are described.

(2-1) Specific Example of Processing of Superpixel Segmenting Part

First, a specific example of processing of the superpixel segmenting part 1721 included in the specifying section 1720 is described. FIG. 20 is a diagram illustrating a specific example of the processing of the superpixel segmenting part. As illustrated in FIG. 20, the superpixel segmenting part 1721 includes a segmenting portion 2010 that performs a simple linear iterative clustering (SUC) process, for example. A set of segmented pixels is referred to as a superpixel.

The segmenting portion 2010 acquires an incorrect inference image 410 for each object, and segments objects included in respective object-unit incorrect inference images 2001 and 2002 into superpixels, the superpixels being a region for each element object. The superpixel segmenting part 1721 outputs object-unit superpixel segmentation information 2011 and 2012 generated by the segmentation into the superpixels by the segmenting portion 2010.

The example of FIG. 20 illustrates a case where the image refiner part 301 generates the score-maximized refine image with the second generation method. In the case of the second generation method, since the object-unit important feature index maps, the number of which corresponds to the number of objects, are generated, the superpixel segmenting part 1721 also generates the object-unit superpixel segmentation information corresponding to the number of the objects.

On the other hand, when the image refiner part 301 generates the score-maximized refine image with the first generation method, the superpixel segmenting part 1721 generates the superpixel segmentation information that includes all the objects and has the size of 1.

(2-2) Specific Example of Processing of Important Superpixel Determining Part

Next, a specific example of processing of the important superpixel determining part 1722 included in the specifying section 1720 is described. FIG. 21 is a diagram illustrating a specific example of the processing of the important superpixel determining part. As illustrated in FIG. 21, the important superpixel determining part 1722 superimposes the object-unit important feature index maps 1831 and 1832 outputted from the superimposing part 1713 and the object-unit superpixel segmentation information 2011 and 2012 outputted from the superpixel segmenting part 1721. As such, the important superpixel determining part 1722 generates object-unit important superpixel images 2101 and 2102. FIG. 21 illustrates a case where an (inverted) important feature index map is used as the object-unit important feature index maps 1831 and 1832.

The important superpixel determining part 1722 adds up a pixel value of each pixel of the object-unit important feature index map 1831 for each superpixel in the generated object-unit important superpixel image 2101. The important superpixel determining part 1722 similarly adds up a pixel value of each pixel of the object-unit important feature index map 1832 for each superpixel in the generated object-unit important superpixel image 2102. In FIG. 21, object-unit important superpixel images 2111 and 2112 clearly illustrate an example of the added value for each superpixel for each of the objects.

The important superpixel determining part 1722 determines whether the added value for each superpixel is larger than or equal to the important feature index threshold, and extracts superpixels for which the added value is determined to be larger than or equal to the important feature index threshold. In FIG. 21, the hatched region (the front grille of the vehicle 411 and between the front grille and the left headlight) represents the extracted superpixel.

The important superpixel determining part 1722 notifies the narrowing down part 1723 of the extracted superpixels as object-unit important superpixels.

The example of FIG. 21 illustrates a case where the image refiner part 301 generates the score-maximized refine image with the second generation method. As illustrated in FIG. 21, in the case of the second generation method, object-unit superpixel segmentation information and an object-unit feature index map, which correspond to a size of each object, are generated. Therefore, an object-unit important superpixel image having the size of each object is generated.

As a result, the pixel value of the object-unit important feature index map is also added for each object, using the object-unit important superpixel image. The important superpixel is also extracted for each object, using the object-unit important superpixel image.

On the other hand, when the image refiner part 301 generates the score-maximized refine image with the first generation method, the superpixel segmentation information that includes all the objects and has the size of 1 is generated. Therefore, the important superpixel determining part 1722 superimposes each of the object-unit important feature index maps having the size of each object to one piece of the superpixel segmentation information. This generates the object-unit important superpixel images having the size that includes all the objects, for the number of the objects.

As a result, the pixel value of the object-unit important feature index map is also added for each object, using the object-unit important superpixel image having the size that includes all the objects. The important superpixel is also extracted for each object, using the object-unit important superpixel image having the size that includes all the objects.

(2-3) Specific Example of Processing of Narrowing Down Part

Figure 22:
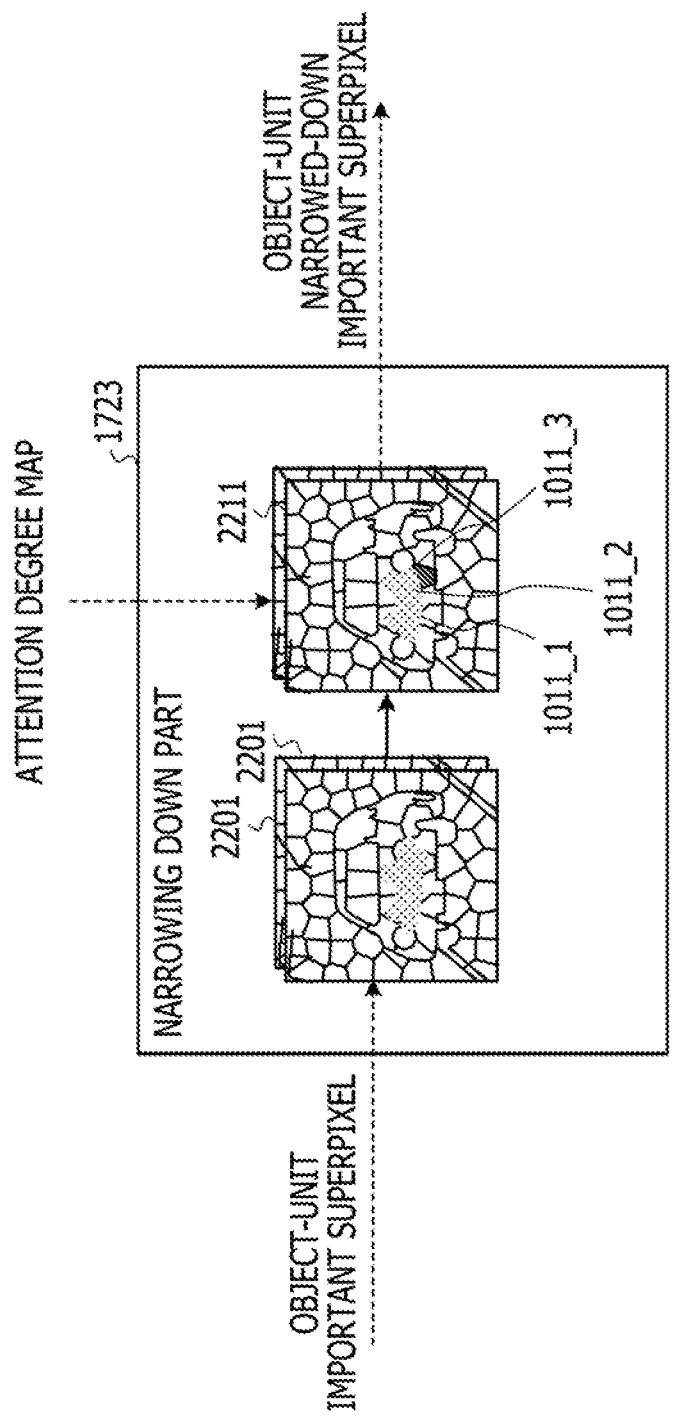
FIG. 22 is a diagram illustrating a specific example of processing of a narrowing down part.

Next, a specific example of processing of the narrowing down part 1723 included in the specifying section 1720 is described. FIG. 22 is a diagram illustrating the specific example of the processing of the narrowing down part.

As illustrated in FIG. 22, the narrowing down part 1723 superimposes the regions 1011_1 to 1011_3 and 1012_1 to 1012_3 of the attention degree map 1010 on the object-unit important superpixels 2201 and 2202.

In FIG. 22, reference numeral 2211 indicates a case where the regions 1011_1 to 1011_3 of the attention degree map 1010 are superimposed on the object-unit important superpixel 1311.

As such, by using the object-unit important superpixels and the attention degree map, the narrowing down part 1723 may narrow down the object-unit important superpixels to a predetermined level region of the attention degree map.

The narrowing down part 1723 notifies the detailed cause analyzing section 1730 of the narrowed-down object-unit important superpixels as the object-unit narrowed-down important superpixels.

The example of FIG. 22 illustrates the case where the important superpixel determining part 1722 notifies the object-unit important superpixel extracted using the object-unit important superpixel image having the size of each object. In the example of FIG. 22, the narrowing down part 1723 superimposes the attention degree map having the size of each object on the object-unit important superpixels having the size of each object.

On the other hand, when the important superpixel determining part 1722 notifies the object-unit important superpixels extracted using the object-unit important superpixel image having the size that includes all the objects, the narrowing down part 1723 notifies the detailed cause analyzing section 1730 of the object-unit narrowed-down important superpixel of each object by superimposing the attention degree map having the size of each object on the object-unit important superpixel having the size that includes all the objects.

(3) Specific Example of Processing of Detailed Cause Analyzing Section

Next, a specific example of the processing of the detailed cause analyzing section 1730 is described. First, the functional configuration of the detailed cause analyzing section 1730 is described.

(3-1) Functional Configuration of Detailed Cause Analyzing Section

Figure 23:
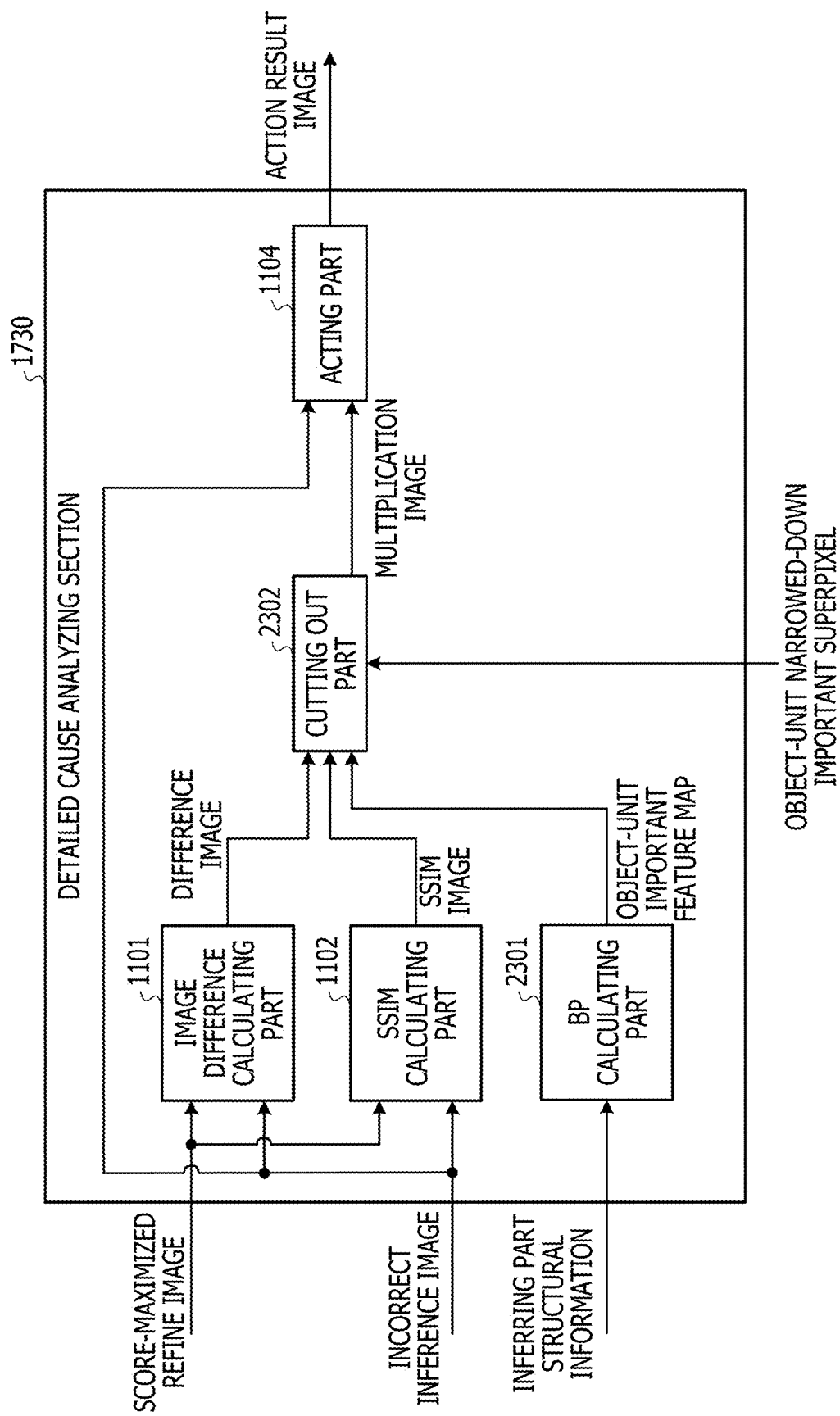
FIG. 23 is a second diagram illustrating an example of the functional configuration of the detailed cause analyzing section.

FIG. 23 is a second diagram illustrating an example of the functional configuration of the detailed cause analyzing section. The differences from the functional configuration illustrated in FIG. 11 are that in the case of FIG. 23, the detailed cause analyzing section includes a BP calculating part 2301 and the function of a cutting out part 2302 is different from that of the cutting out part 1103 illustrated in FIG. 11.

The BP calculating part 2301 acquires, from the inferring part 303, inferring part structural information at the time of inferring a label with a score-maximized refine image as an input. The BP calculating part 2301 generates an object-unit important feature map based on the inferring part structural information using the selective BP method, for example.

As in the case of the cutting out part 1103, the cutting out part 2302 cuts out an image portion corresponding to the object-unit narrowed-down important superpixel from a difference image and an SSIM image. The cutting out part 2302 also cuts out an image portion corresponding to the object-unit narrowed-down important superpixel from the object-unit important feature map. The cutting out part 2302 multiplies the difference image, the SSIM image, and each object-unit important feature map, from which the image portions corresponding to the object-unit narrowed-down important superpixels have been cut out, to generate a multiplication image.

By multiplying the difference image, the SSIM image, and each object-unit important feature map, it is possible to visualize the image section that causes incorrect inference for each pixel in an action result image.

By using the difference image in the multiplication, the action result image is automatically corrected to an image that increases a correct label score. Therefore, the difference image may be outputted as the action result image. When such an advantage is not taken into consideration, the detailed cause analyzing section 1730 may multiply using the SSIM image and each object-unit important feature map (rather than using the difference image), and output the action result image.

(3-2) Specific Example of Processing of Detailed Cause Analyzing Section

Figure 24:
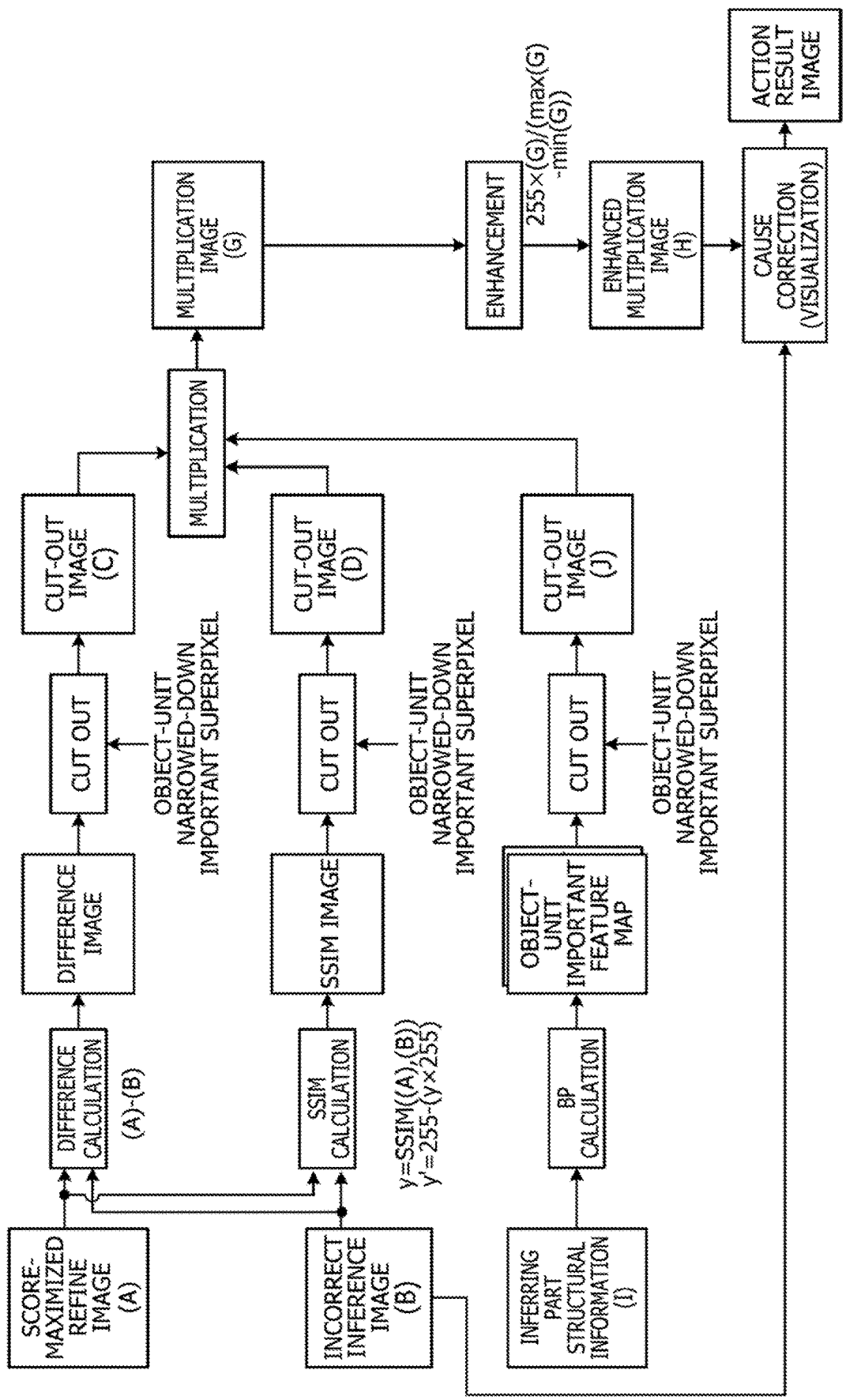
FIG. 24 is a second diagram illustrating a specific example of the processing of the detailed cause analyzing section.

Next, a specific example of the processing of the detailed cause analyzing section 1730 is described. FIG. 24 is a second diagram illustrating a specific example of the processing of the detailed cause analyzing section. The difference from the specific example of the processing of the detailed cause analyzing section 143 illustrated in FIG. 12 is that the BP calculating part 2301 performs a process using the selective BP method based on inferring part structural information (I) to generate an object-unit important feature map. Another difference is that the cutting out part 2302 cuts out an image portion corresponding to the object-unit narrowed-down important superpixel from the object-unit important feature map, and outputs a cut-out image (J). Still another difference is that the cutting out part 2302 multiplies a cut-out image (C), a cut-out image (D), and the cut-out image (J) to generate a multiplication image (G).

<Flow of Incorrect Inference Cause Extracting Process>

Next, the flow of an incorrect inference cause extracting process performed by the incorrect inference cause extracting unit 140 is described. FIG. is a second flowchart illustrating the flow of the incorrect inference cause extracting process. The differences from the flowchart illustrated in FIG. 13 are steps S2501 and S2502.

In step S2501, the important feature index map generating section 1710 and the specifying section 1720 execute an object-unit narrowed-down important superpixel extracting process. The object-unit narrowed-down important superpixel extracting process is described in detail later.

In step S2502, the detailed cause analyzing section 1730 performs a detailed cause analyzing process. The detailed cause analyzing process is described in detail later.

<Flow of Object-Unit Narrowed-Down Important Superpixel Extracting Process>

Figure 25:
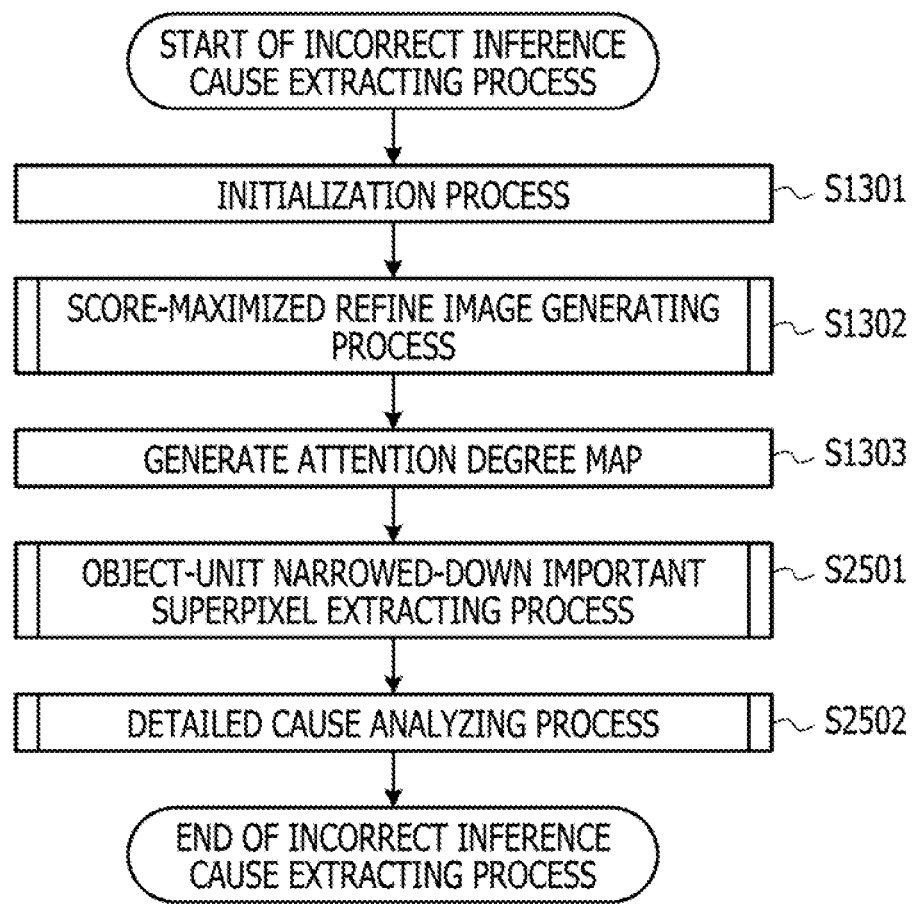
FIG. 25 is a second flowchart illustrating the flow of the incorrect inference cause extracting process.
Figure 26:
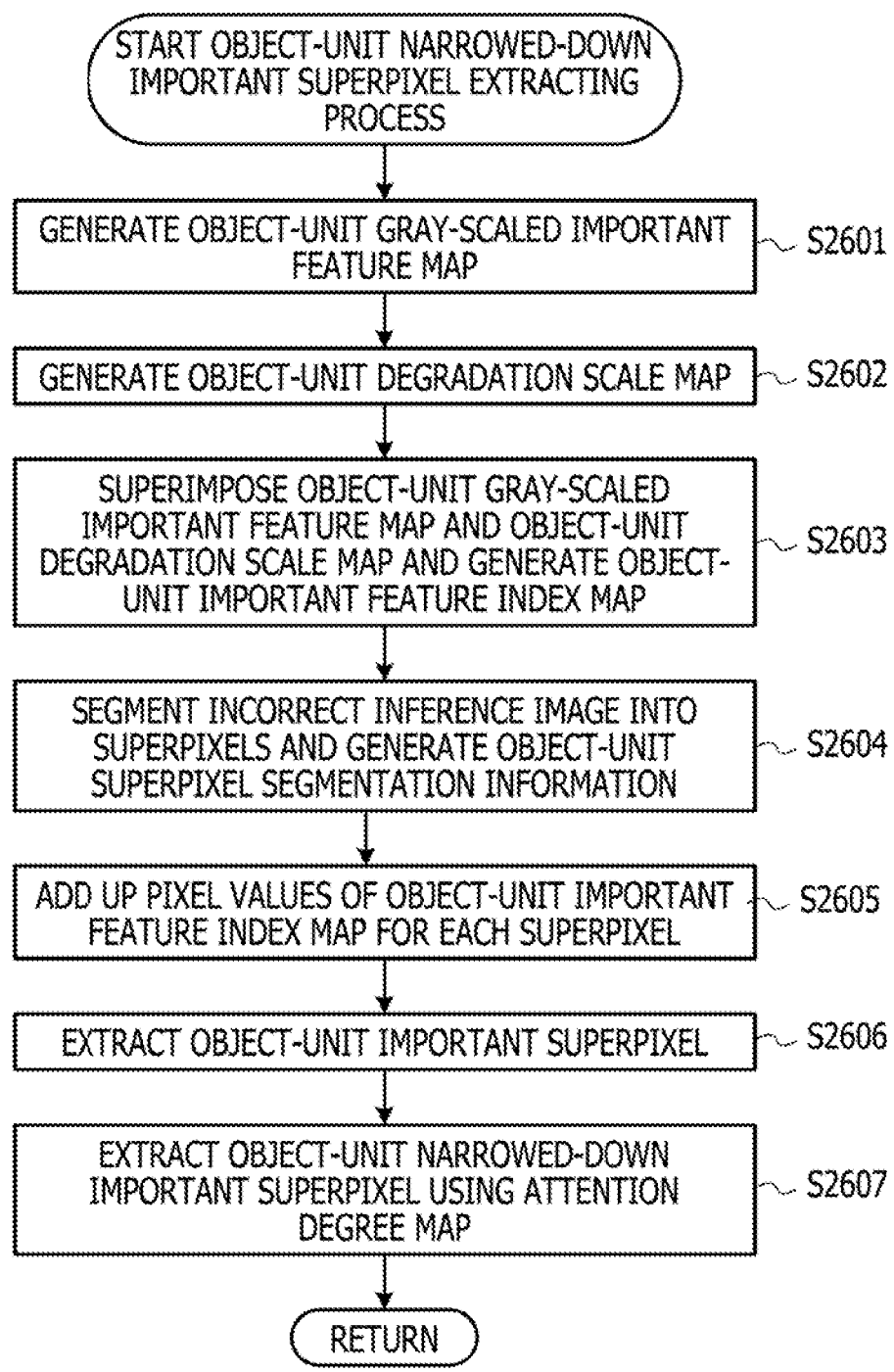
FIG. 26 is a flowchart illustrating the flow of an object-unit narrowed-down important superpixel extracting process.

Next, the flow of step S2501 (object-unit narrowed-down important superpixel extracting process) in FIG. 25 is described. FIG. 26 is a flowchart illustrating the flow of the object-unit narrowed-down important superpixel extracting process.

In step S2601, the important feature map generating part 1711 acquires, from the inferring part 303, inferring part structural information at the time of inferring a label with the score-maximized refine image as an input. The important feature map generating part 1711 generates an object-unit gray-scaled important feature map based on the acquired inferring part structural information.

In step S2602, the degradation scale map generating part 1712 generates an object-unit degradation scale map based on the object-unit incorrect inference image and the object-unit score-maximized refine image.

In step S2603, the superimposing part 1713 generates an object-unit important feature index map based on the object-unit gray-scaled important feature map and the object-unit degradation scale map.

In step S2604, the superpixel segmenting part 1721 segments the incorrect inference image into superpixels, each of which is a region for each element object, and generates the object-unit superpixel segmentation information.

In step S2605, the important superpixel determining part 1722 adds up a pixel value of each pixel in the object-unit important feature index map, for each superpixel.

In step S2606, the important superpixel determining part 1722 extracts the superpixels having added values larger than or equal to the important feature index threshold, as the object-unit important superpixels.

In step S2607, the narrowing down part 1723 narrows down the extracted object-unit important superpixels to a predetermined level region of the attention degree map. The narrowing down part 1723 notifies the detailed cause analyzing section 1730 of the narrowed-down object-unit important superpixels as the object-unit narrowed-down important superpixels.

<Flow of Detailed Cause Analyzing Process>

Figure 27:
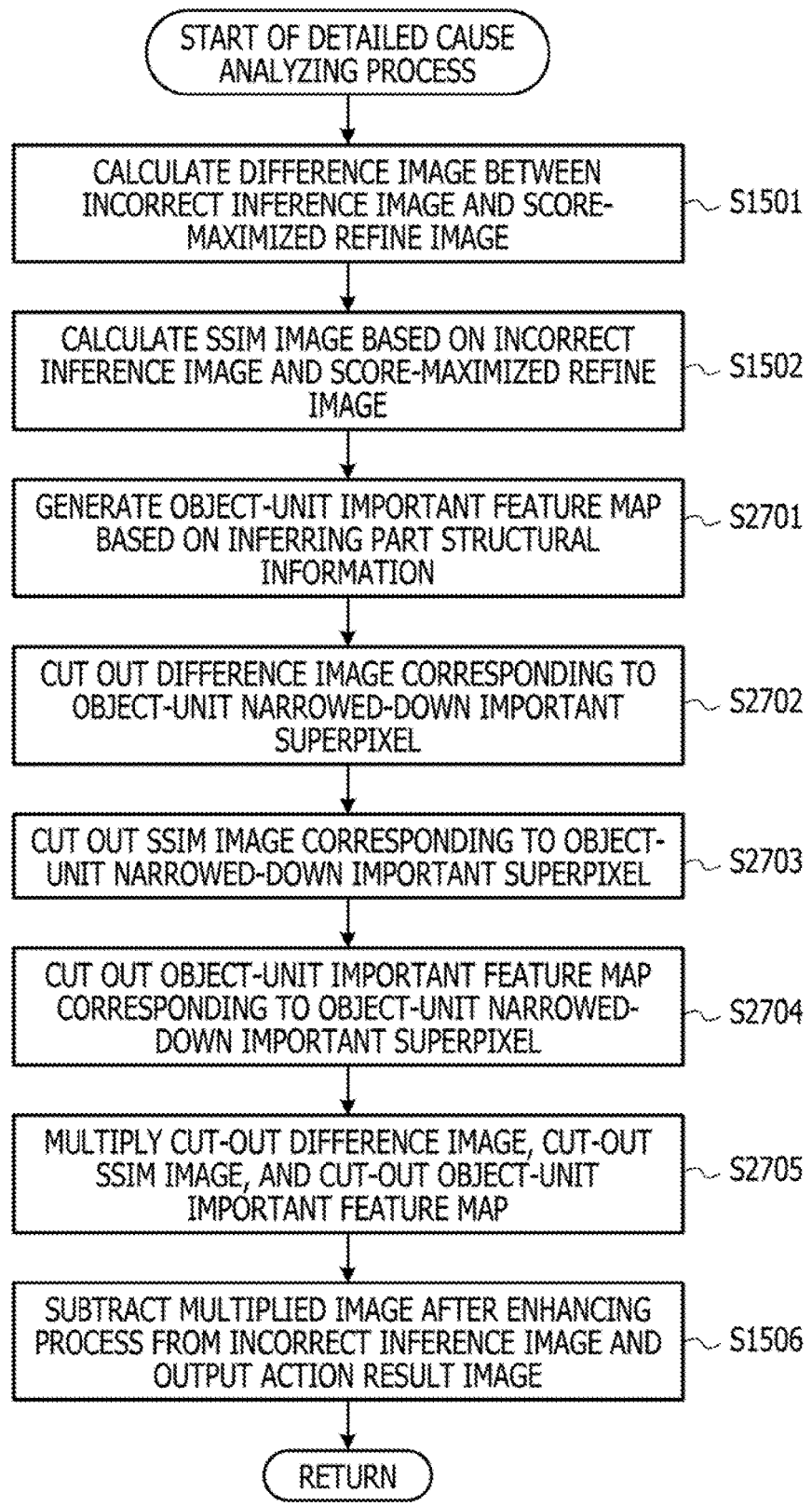
FIG. 27 is a second flowchart illustrating the flow of the detailed cause analyzing process.

Next, the flow of the detailed cause analyzing process performed by the detailed cause analyzing section 1730 is described. FIG. 27 is a second flowchart illustrating the flow of the detailed cause analyzing process. The differences from the flowchart illustrated in FIG. 15 are steps S2701 to S2705.

In step S2701, the BP calculating part 2301 generates an object-unit important feature map based on the inferring part structural information.

In step S2702, the cutting out part 2302 cuts out an image portion corresponding to the object-unit narrowed-down important superpixel from the difference image.

In step S2703, the cutting out part 2302 cuts out an image portion corresponding to the object-unit narrowed-down important superpixel from the SSIM image.

In step S2704, the cutting out part 2302 cuts out an image portion corresponding to the object-unit narrowed-down important superpixel from the object-unit important feature map.

In step S2705, the cutting out part 1103 multiplies the cut-out difference image, the cut-out SSIM image, and the cut-out object-unit important feature map to generate a multiplication image.

<Specific Example of Incorrect Inference Cause Extracting Process>

Figure 28:
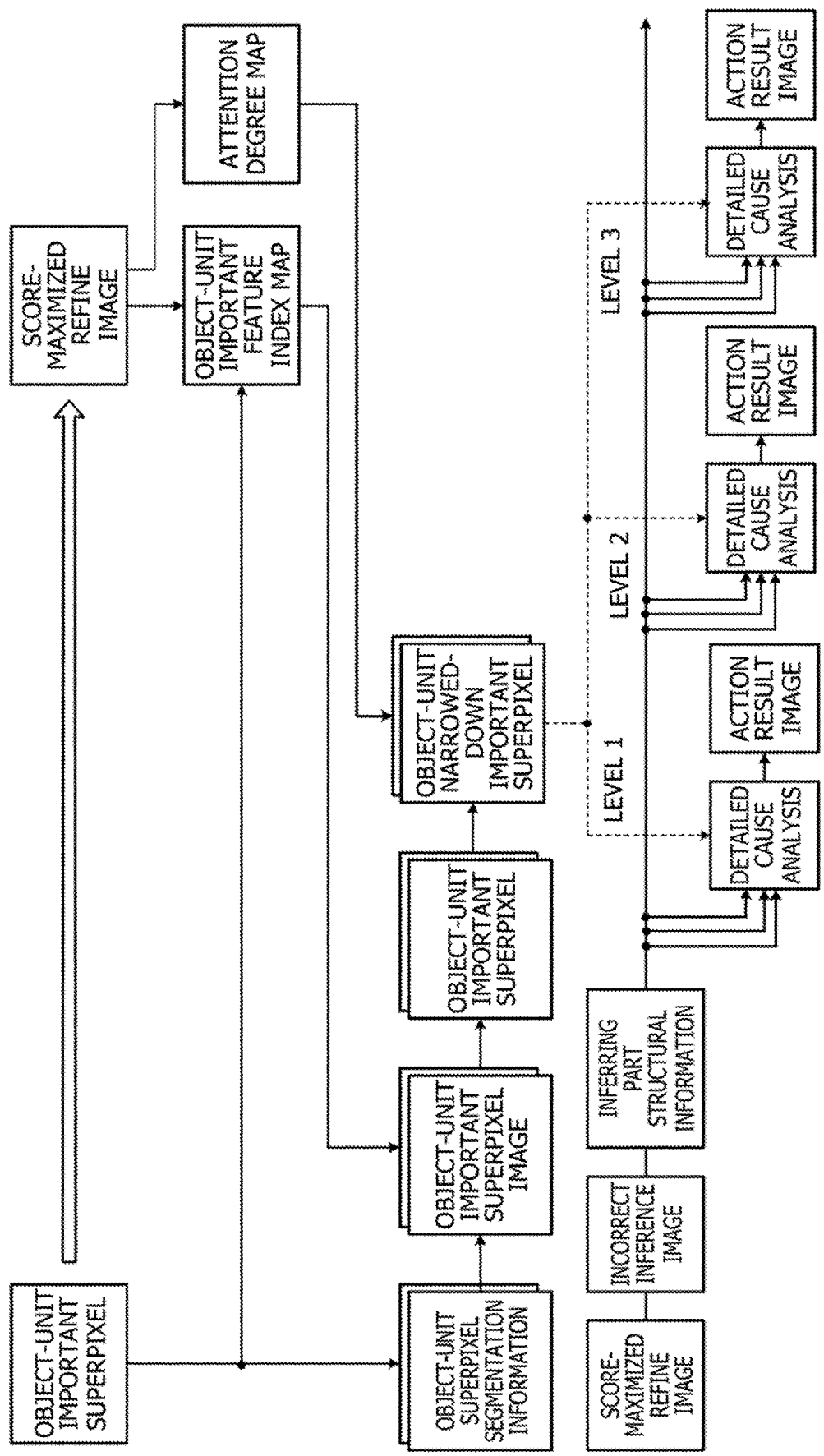
FIG. 28 is a second diagram illustrating a specific example of the incorrect inference cause extracting process.

Next, a specific example of the incorrect inference cause extracting process performed by the incorrect inference cause extracting unit 140 is described. FIG. 28 is a second diagram illustrating a specific example of the incorrect inference cause extracting process.

As illustrated in FIG. 28, first, the refine image generating section 141 generates a score-maximized refine image from an incorrect inference image. Then, the important feature index map generating section 1710 generates an object-unit important feature index map. Subsequently, the attention degree map generating section 142 generates an attention degree map.

As the incorrect inference image is read for each object, the superpixel segmenting part 1721 generates object-unit superpixel segmentation information.

Subsequently, the important superpixel determining part 1722 adds up the pixel value of the object-unit important feature index map for each superpixel that is segmented based on the object-unit superpixel segmentation information, and generates an object-unit important superpixel image.

The important superpixel determining part 1722 extracts the superpixels having added values larger than or equal to the important feature index threshold as the object-unit important superpixels from the object-unit important superpixel image.

The narrowing down part 1723 extracts the object-unit narrowed-down important superpixel corresponding to the region of each level of the attention degree map, from the object-unit important superpixels extracted by the important superpixel determining part 1722.

Subsequently, the detailed cause analyzing section 1730 uses the score-maximized refine image, the incorrect inference image, and the inferring part structural information to perform a detailed cause analyzing process on the object-unit narrowed-down important superpixel, and outputs an action result image.

As is clear from the above description, the analysis apparatus 100 according to the fourth embodiment generates the score-maximized refine image having the maximized correct label score of inference, from the incorrect inference image by which an incorrect label is inferred in the image recognition process.

The analysis apparatus 100 according to the fourth embodiment generates the attention degree map indicating a region of pixels with the same level of attention degree, which have drawn attention at the time of inference, of a plurality of the pixels in the score-maximized refine image.

The analysis apparatus 100 according to the fourth embodiment generates an object-unit important feature index map that indicates the degree of importance of each pixel for inferring a correct label.

The analysis apparatus 100 according to the fourth embodiment adds up the pixel values in the object-unit important feature index map for each superpixel (for each pixel set), and extracts object-unit important superpixels having the added values that satisfy a predetermined condition. The analysis apparatus 100 according to the fourth embodiment narrows down the extracted object-unit important superpixels to a predetermined level region of the attention degree map.

The analysis apparatus 100 according to the fourth embodiment cuts out a region corresponding to the narrowed-down object-unit important superpixel from the images (the difference image and the SSIM image) calculated based on the incorrect inference image and the score-maximized refine image, and the important feature map. The analysis apparatus 100 according to the fourth embodiment performs an enhancing process for each pixel on the cut out image.

As such, according to the fourth embodiment, It is possible to improve the precision at the time of specifying an image section that causes incorrect inference by performing the enhancing process for each pixel on the object-unit important superpixel narrowed down to the predetermined level region of the attention degree map.

Fifth Embodiment

In the aforementioned fourth embodiment, the description is given on the assumption that the incorrect inference cause extracting process is performed on the input image extracted as the incorrect inference image by the incorrect inference image extracting unit 120. However, the input image on which the incorrect inference cause extracting process is performed is not limited to the input image extracted as the incorrect inference image by the incorrect inference image extracting unit 120.

For example, the incorrect inference image extracting unit 120 may perform the incorrect inference cause extracting process on the incorrect inference image that does not match the correct label by deforming a part of an input image (referred to as a correct inference image) that is determined to match the correct label.

In this case, the incorrect inference cause extracting process is performed using the correct inference image as the score-maximized refine image. For example, in the incorrect inference cause extracting unit 140, the process of generating a score-maximized refine image by the refine image generating section 141 may be omitted.

Sixth Embodiment

Although, in the aforementioned fourth embodiment, the description is given of the case where the incorrect inference image includes two objects, the number of objects included in the incorrect inference image is not limited to two, but may be one or three or more.

In the aforementioned fourth embodiment, the description is given on the assumption that the detailed cause analyzing process is performed for the region of each level of the attention degree map. However, the method of the detailed cause analyzing process is not limited thereto. For example, a different level may be set for each of the objects included in the incorrect inference image, and the detailed cause analyzing process may be performed on a region of the set level.

Seventh Embodiment

In the aforementioned fourth embodiment, the description is given on the assumption that the object-unit important superpixels are narrowed down to a predetermined level region of the attention degree map. However, the narrowing-down method by the narrowing down part 1723 is not limited thereto, and a narrowing-down process may be performed according to the level.

Figure 29:
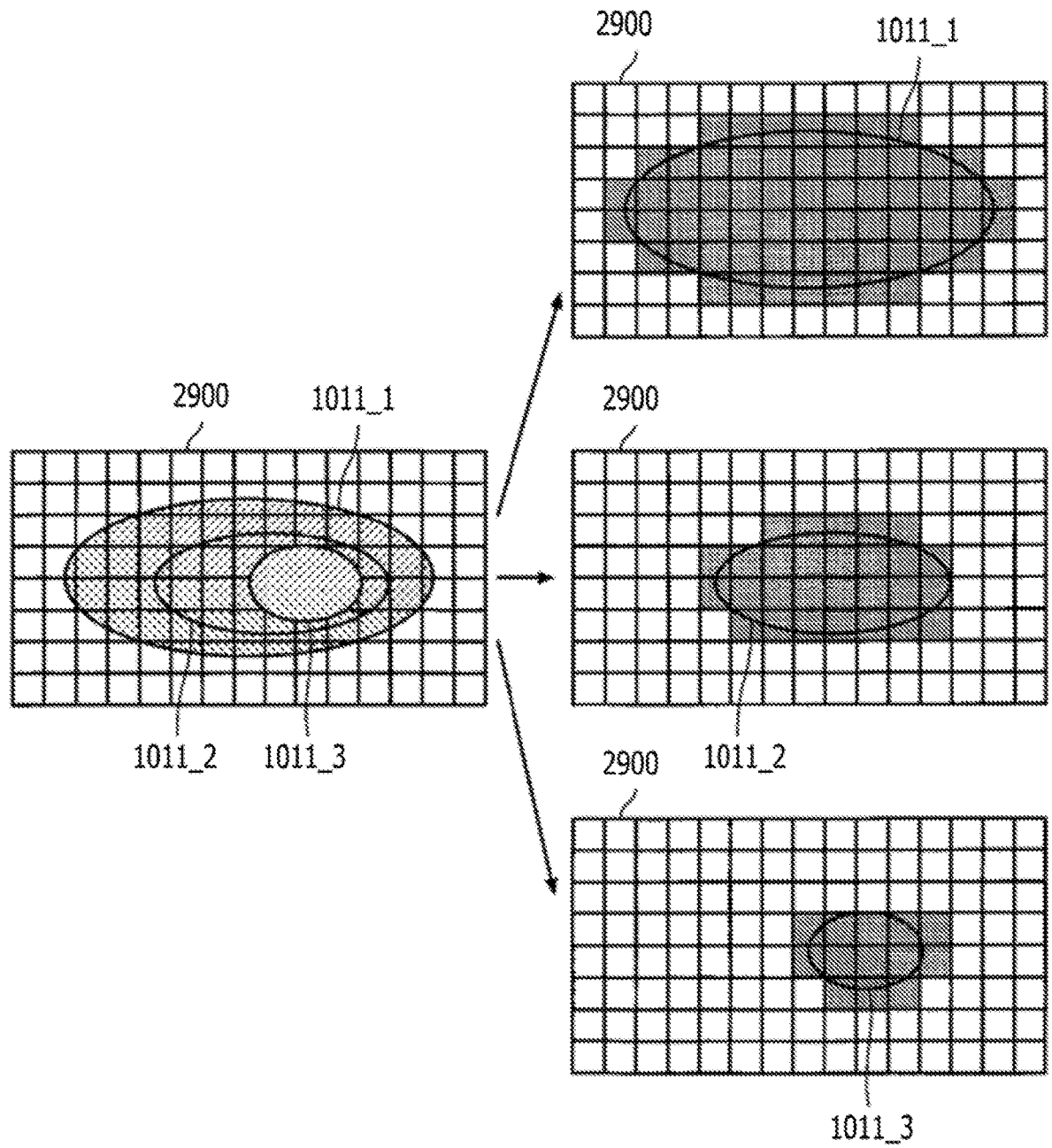
FIG. 29 is a first diagram illustrating details of processing of the narrowing down part.

FIG. 29 is a first diagram illustrating details of processing of the narrowing down part. In FIG. 29, in order to simplify the description, square is used as the shape of the superpixel. As illustrated in FIG. 29, it is assumed that the region 1011_1 of level 1 to the region 1011_3 of level 3 of the attention degree map 1010 are located on the object-unit important superpixels 2900.

In this case, the narrowing down part 1723 narrows down to the object-unit narrowed-down important superpixels according to each level. The upper right of FIG. 29 illustrates a case where the object-unit important superpixels 2900 are narrowed down to the level 1 region 1011_1 (hatched region).

Similarly, the middle right of FIG. 29 illustrates a case where the object-unit important superpixels 2900 are narrowed down to the level 2 region 1011_2 (hatched region).

Similarly, the lower right of FIG. 29 illustrates a case where the object-unit important superpixels 2900 are narrowed down to the level 3 region 1011_3 (hatched region).

As such, the narrowing down part 1723 may narrow down the object-unit important superpixels to a region corresponding to each level of the attention degree map.

Although, in the fourth embodiment, the difference in shape between the object-unit important superpixel and the predetermined level region of the attention degree map is not mentioned, the object-unit important superpixel is different in shape from the predetermined level region of the attention degree map. For this reason, the boundary of the predetermined level region of the attention degree map does not match that of the object-unit important superpixel.

Figure 30A:
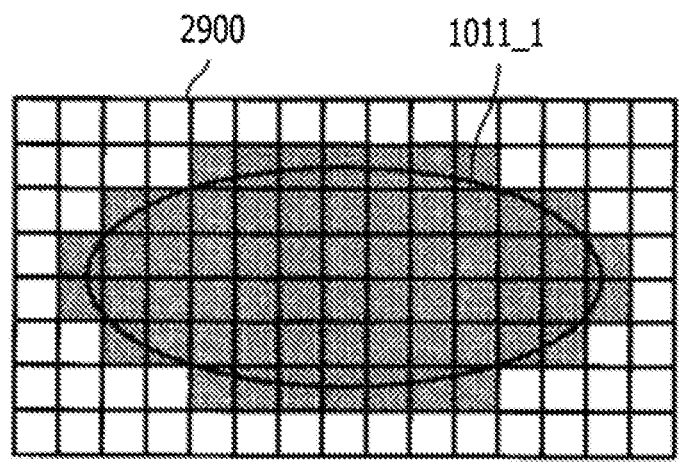
FIGS. 30A to 30C are second diagrams illustrating details of the processing of the narrowing down part.
Figure 30B:
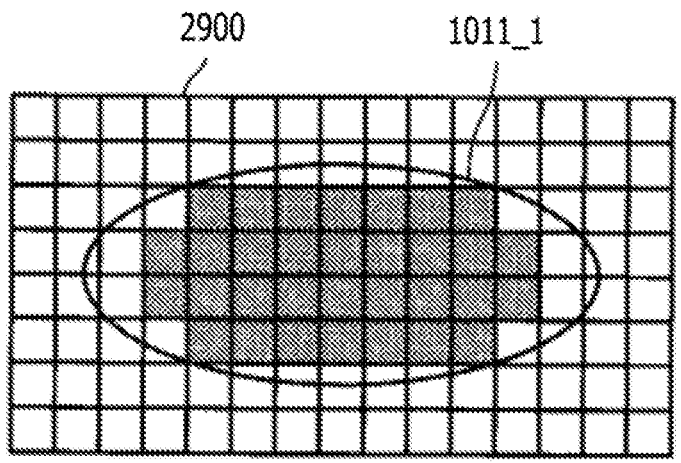
Figure 30C:
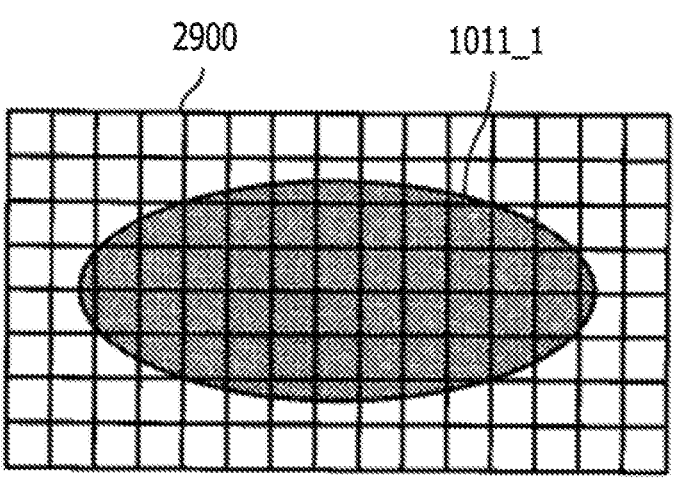

FIGS. 30A to 30C are second diagrams illustrating details of the processing of the narrowing down part. As illustrated in FIGS. 30A to 30C, the narrowing down part 1723 may output any of the hatched regions in FIGS. 30A to 30C as the object-unit narrowed-down important superpixel.

FIG. 30A illustrates a case where, when the object-unit important superpixels 2900 are narrowed down to the level 1 region 1011_1 of the attention degree map 1010, the object-unit important superpixels located within the region 1011_1 and the object-unit important superpixels including the boundary of the region 1011_1 are outputted as the object-unit narrowed-down important superpixels.

On the other hand, FIG. 30B illustrates a case where, when the object-unit important superpixels 2900 are narrowed down to the level 1 region 1011_1 of the attention degree map 1010, the object-unit important superpixels located within the region 1011_1 are outputted as the object-unit narrowed-down important superpixels.

FIG. 30C illustrates a case where, when the object-unit important superpixels 2900 are narrowed down to the level 1 region 1011_1 of the attention degree map 1010, the object-unit important superpixels located within the region 1011_1 and the object-unit important superpixels segmented along the boundary of the region 1011_1 are outputted as the object-unit narrowed-down important superpixels.

As such, the narrowing down part 1723 may perform narrowing-down by various methods even when the object-unit important superpixels are different in shape from the predetermined level region of the attention degree map.

Eighth Embodiment

In the above-described first embodiment, the description is given of the case where both of the two objects included in the incorrect inference image are the vehicles. However, the two objects included in the incorrect inference image are not limited to the vehicles and may be any object other than the vehicles.

The present disclosure is not limited to the configurations illustrated herein while the configurations exemplified according to the aforementioned embodiments may also be combined with other elements, for example. These aspects may be changed without departing from the gist of the present disclosure and appropriately set in accordance with applied modes thereof.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:
1. An analysis apparatus, comprising:
   a memory; and
   a processor coupled to the memory and configured to:
      acquire a refine image that maximizes a score for inferring a correct label by an inferring process using a trained model, the refine image being generated from an input image used when an incorrect label is inferred by the inferring process,
      generate a map indicating a region of pixels having the same or similar level of attention degree related to inference in the inferring process, of a plurality of pixels in the generated refine image, based on a feature amount used in the inferring process,
      extract an image corresponding to a pixel region whose level in the generated map is a predetermined level, from calculated images calculated based on the input image and the refine image, and
      generate an output image that specifies a portion related to an inference error in the inferring process, among the calculated images, based on execution of image processing on the extracted image.
2. The analysis apparatus according to claim 1, wherein the processor is configured to generate an attention degree map using a Grad-CAM method.

3. The analysis apparatus according to claim 1, wherein the processor is configured to
perform image processing for each pixel on a multiplication image obtained by multiplying an image obtained by cutting out a predetermined level region of the attention degree map from a difference image calculated based on a difference between the input image and the refine image, and an image obtained by cutting out a predetermined level region of the map from an SSIM image obtained by performing SSIM calculation on the input image and the refine image.

4. The analysis apparatus according to claim 1, wherein the processor is configured to perform processing for each pixel by cutting out, for each pixel set, an image corresponding to a predetermined level region of the map.

5. The analysis apparatus according to claim 4, wherein the processor is configured to:
generate an index map indicating a degree of importance of each pixel for inferring a correct label, by superimposing a map indicating a pixel to which a change is made in generating the refine image, of a plurality of pixels of the input image and a map indicating an attention degree of each of the pixels that has drawn attention at the time of inference, of a plurality of pixels of the refine image;
add up the pixel values of the index map for each pixel set and extracting a pixel set having an added value that satisfies a predetermined condition, and
narrow down the extracted pixel set to a predetermined level region of the attention degree map, wherein
the image processing includes processing, for each pixel, an image corresponding to the predetermined level region of the attention degree map by cutting out the image for each narrowed-down pixel set.

6. The analysis apparatus according to claim 5, wherein the processor is configured to adjust the magnitude of the pixel value for each pixel on a multiplication image obtained by multiplying
an image obtained by cutting out, for each narrowed down pixel set, the predetermined level region of the attention degree map from a difference image calculated based on a difference between the input image and the refine image,
an image obtained by cutting out, for each narrowed-down pixel set, the predetermined level region of the attention degree map from an SSIM image obtained by performing SSIM calculation on the input image and the refine image, and
an image obtained by cutting out, for each narrowed-down pixel set, the predetermined level region of the map from a map indicating an attention degree of each pixel that has drawn attention at the time of inference, of a plurality of the pixels in the refine image.

7. The analysis apparatus according to claim 1, the processor is configured to adjust the magnitude of the pixel value.

8. The analysis apparatus according to claim 1, wherein the trained model is a convolutional neural network.

9. A non-transitory computer-readable storage medium storing a program that causes a computer to execute a process, the process comprising:
acquiring a refine image that maximizes a score for inferring a correct label by an inferring process using a trained model, the refine image being generated from an input image used when an incorrect label is inferred by the inferring process;
generating a map indicating a region of pixels having the same or similar level of attention degree related to inference in the inferring process, of a plurality of pixels in the generated refine image, based on a feature amount used in the inferring process;
extracting an image corresponding to a pixel region whose level in the generated map is a predetermined level, from calculated images calculated based on the input image and the refine image; and
generating an output image that specifies a portion related to an inference error in the inferring process, among the calculated images, based on execution of image processing on the extracted image.

10. An analysis method executed by a computer, the analysis method comprising:
acquiring a refine image that maximizes a score for inferring a correct label by an inferring process using a trained model, the refine image being generated from an input image used when an incorrect label is inferred by the inferring process;
generating a map indicating a region of pixels having the same or similar level of attention degree related to inference in the inferring process, of a plurality of pixels in the generated refine image, based on a feature amount used in the inferring process;
extracting an image corresponding to a pixel region whose level in the generated map is a predetermined level, from calculated images calculated based on the input image and the refine image; and
generating an output image that specifies a portion related to an inference error in the inferring process, among the calculated images, based on execution of image processing on the extracted image.

* * * * *